(12) United States Patent
Milburn et al.

(10) Patent No.: US 7,213,618 B2
(45) Date of Patent: *May 8, 2007

(54) GAS-PANEL ASSEMBLY

(75) Inventors: Matthew L. Milburn, Felton, CA (US); Bruce C. Wier, Sunnyvale, CA (US)

(73) Assignee: Ultra Clean Holdings, Inc., Menlo Park, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 11/105,730

(22) Filed: Apr. 13, 2005

(65) Prior Publication Data

US 2005/0224121 A1  Oct. 13, 2005

Related U.S. Application Data

(63) Continuation-in-part of application No. 10/823,974, filed on Apr. 13, 2004, now Pat. No. 7,048,008.

(51) Int. Cl.
*F16K 11/10* (2006.01)

(52) U.S. Cl. ..................................... 137/884

(58) Field of Classification Search ............... 137/269, 137/270, 271, 597, 884
See application file for complete search history.

(56) References Cited

U.S. PATENT DOCUMENTS

| | | | |
|---|---|---|---|
| 4,008,736 A | 2/1977 | Wittmann-Liebold et al. | |
| 4,807,660 A | 2/1989 | Aslonion | |
| 5,361,805 A | 11/1994 | Moyeux | |
| 5,368,062 A | 11/1994 | Okumura et al. | |
| 5,488,925 A | 2/1996 | Kumada | |
| 5,529,088 A | 6/1996 | Asou | |
| 5,605,179 A | 2/1997 | Strong et al. | |
| 5,657,786 A | 8/1997 | DuRoss et al. | |
| 5,713,582 A | 2/1998 | Swensen et al. | |
| 5,720,317 A | 2/1998 | Nimberger | |
| 5,730,448 A | 3/1998 | Swensen et al. | |
| 5,735,532 A | 4/1998 | Nolan et al. | |
| 5,735,533 A | 4/1998 | Nolan et al. | |

(Continued)

FOREIGN PATENT DOCUMENTS

DE  26 30 050 A1  1/1978

(Continued)

OTHER PUBLICATIONS

Uchisawa, O. et al., "Compact Gas Control System", 18$^{th}$ Workshop on ULSI Ultra Clean Technology, Physics and Chemistry of Specialty Gases for Advanced Semiconductor Processings, pp. 15-24, 1992.

*Primary Examiner*—John Fox
(74) *Attorney, Agent, or Firm*—Peter J. Dehlinger; Perkins Coie LLP

(57) ABSTRACT

A fluid manifold and components for constructing the fluid manifold having a plurality of separate fluid-flow pathways are disclosed. The manifold includes a plurality of pipe modules which form the fluid-flow pathways and a plurality of block modules which can be placed together in various configurations with the pipe modules to form the fluid manifold. The pipe modules have terminal collars or flanges by which they are supported within the block modules, and the block module construction allows modules to be removed and replaced without removal of adjacent block or pipe modules.

20 Claims, 16 Drawing Sheets

U.S. PATENT DOCUMENTS

| | | | |
|---|---|---|---|
| 5,819,782 | A | 10/1998 | Itafuji |
| 5,836,355 | A | 11/1998 | Markulec et al. |
| 5,860,676 | A | 1/1999 | Brzezicki et al. |
| 5,983,933 | A | 11/1999 | Ohmi et al. |
| 5,992,463 | A | 11/1999 | Redemann et al. |
| 6,039,360 | A | 3/2000 | Ohmi et al. |
| 6,085,783 | A | 7/2000 | Hollingshead |
| 6,123,340 | A | 9/2000 | Sprafka et al. |
| 6,142,539 | A | 11/2000 | Redemann et al. |
| 6,189,570 | B1 | 2/2001 | Redemann et al. |
| 6,192,938 | B1 | 2/2001 | Redemann et al. |
| 6,283,155 | B1 | 9/2001 | Vu |
| 6,394,138 | B1 | 5/2002 | Vu et al. |
| 6,435,215 | B1 | 8/2002 | Redemann et al. |
| 6,474,700 | B2 | 11/2002 | Redemann et al. |
| 6,502,601 | B2 | 1/2003 | Eidsmore et al. |
| 6,546,961 | B2 | 4/2003 | Fukushima |
| 6,615,871 | B2 | 9/2003 | Ohmi et al. |
| 6,629,546 | B2 | 10/2003 | Eidsmore et al. |
| 6,640,835 | B1 | 11/2003 | Rohrberg et al. |
| 6,644,353 | B1 | 11/2003 | Eidsmore |
| 6,776,193 | B2 | 8/2004 | Eidsmore |
| 2002/0000256 | A1 | 1/2002 | Eidsmore et al. |
| 2004/0112446 | A1 | 6/2004 | Eidsmore et al. |
| 2004/0112447 | A1 | 6/2004 | Eidsmore |
| 2005/0056330 | A2 | 3/2005 | Eidsmore et al. |

FOREIGN PATENT DOCUMENTS

| | | |
|---|---|---|
| EP | 0 637 712 B1 | 2/1995 |
| EP | 0 754 896 B1 | 1/1997 |
| EP | 0 715 112 A2 | 5/1997 |
| EP | 0 816 731 B1 | 1/1998 |
| EP | 0 837 278 A1 | 4/1998 |
| EP | 0 844 424 B1 | 5/1998 |
| EP | 0 845 623 B1 | 6/1998 |
| EP | 0 859 155 B1 | 8/1998 |
| EP | 0 905 383 A1 | 3/1999 |
| EP | 0 908 929 B1 | 4/1999 |
| EP | 1 239 203 A1 | 9/2002 |
| WO | WO99/45302 | 9/1999 |

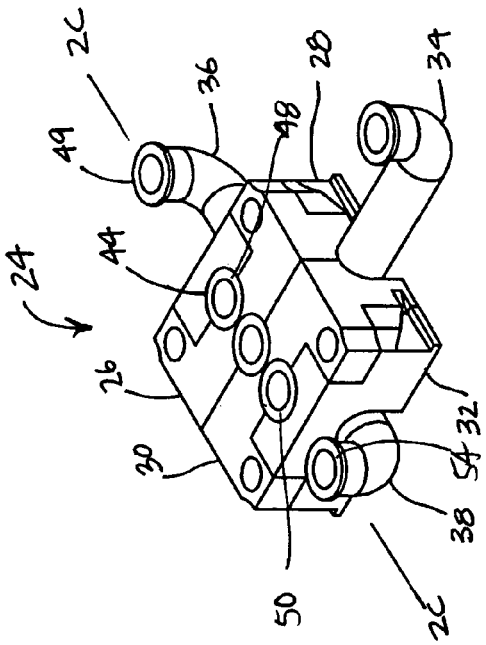
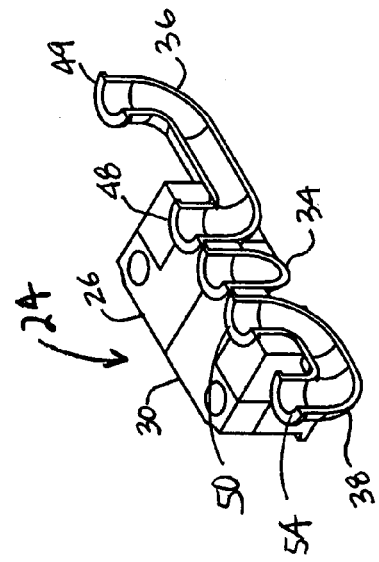
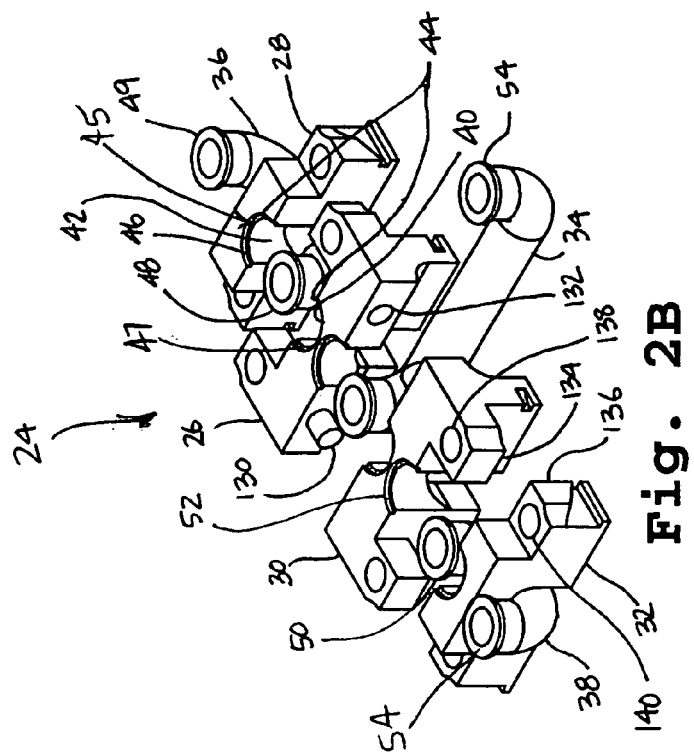

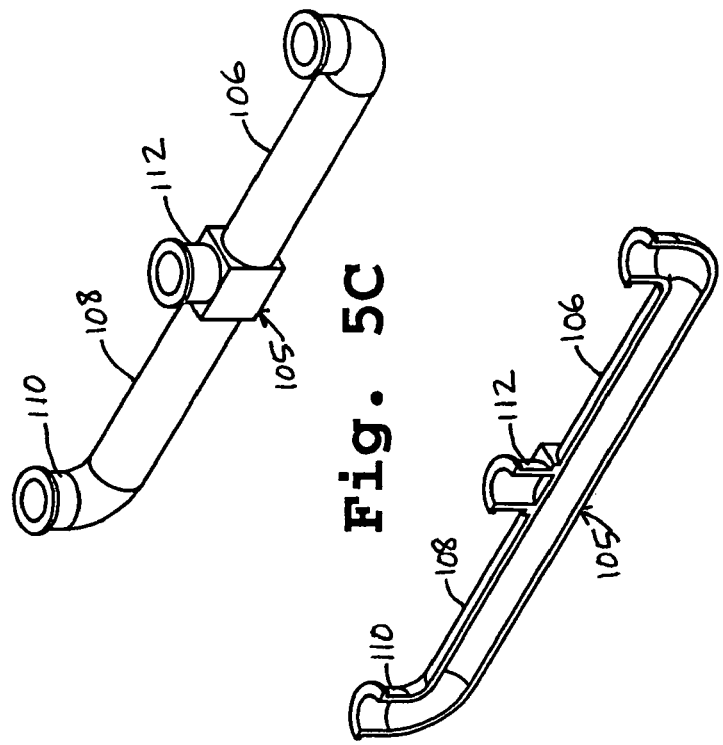
Fig. 5C
Fig. 5D
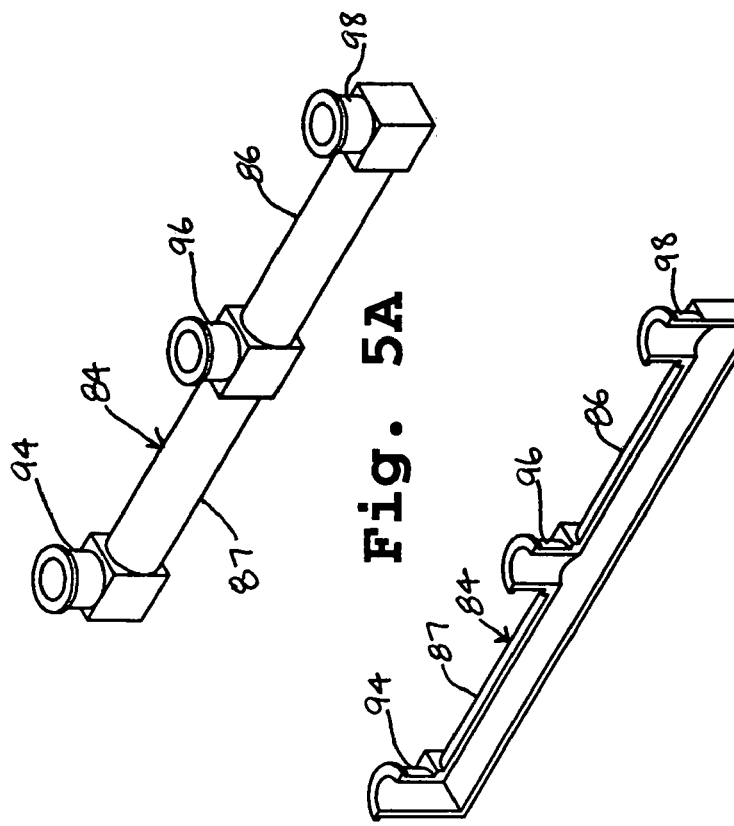
Fig. 5A
Fig. 5B

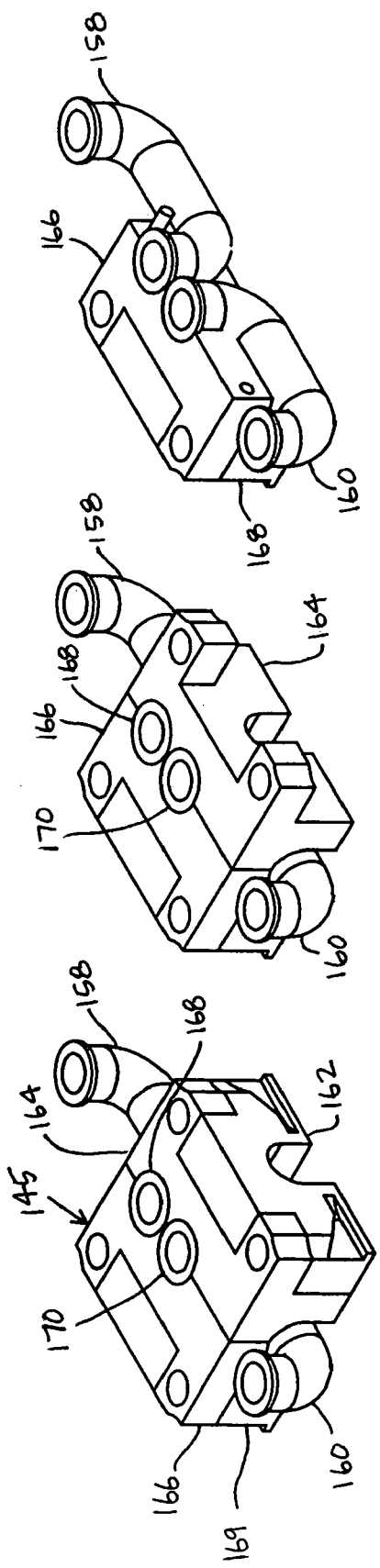
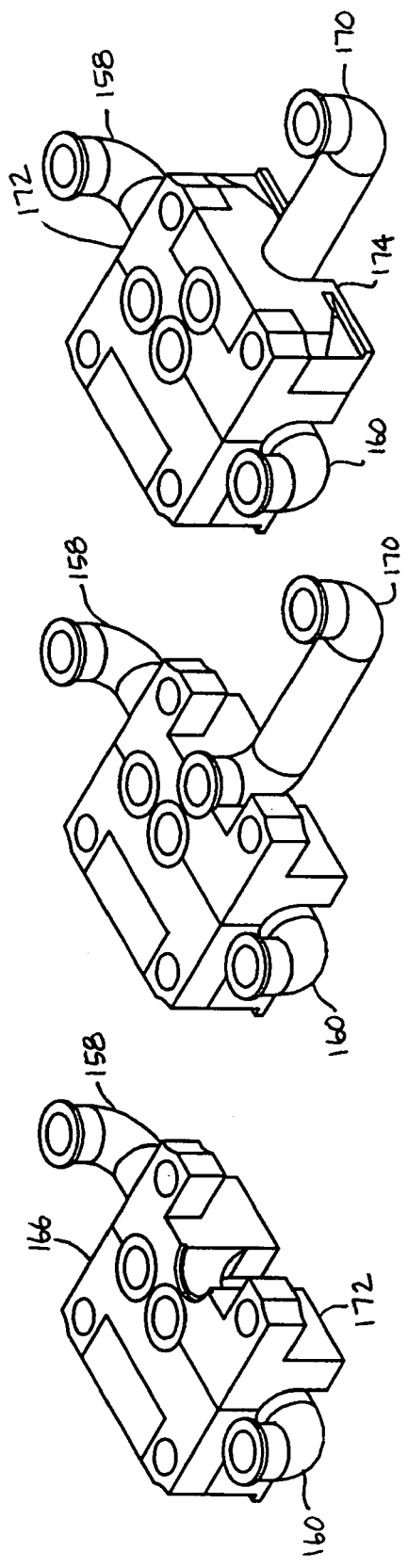
Fig. 7A Fig. 7B Fig. 7C
Fig. 7D Fig. 7E Fig. 7F

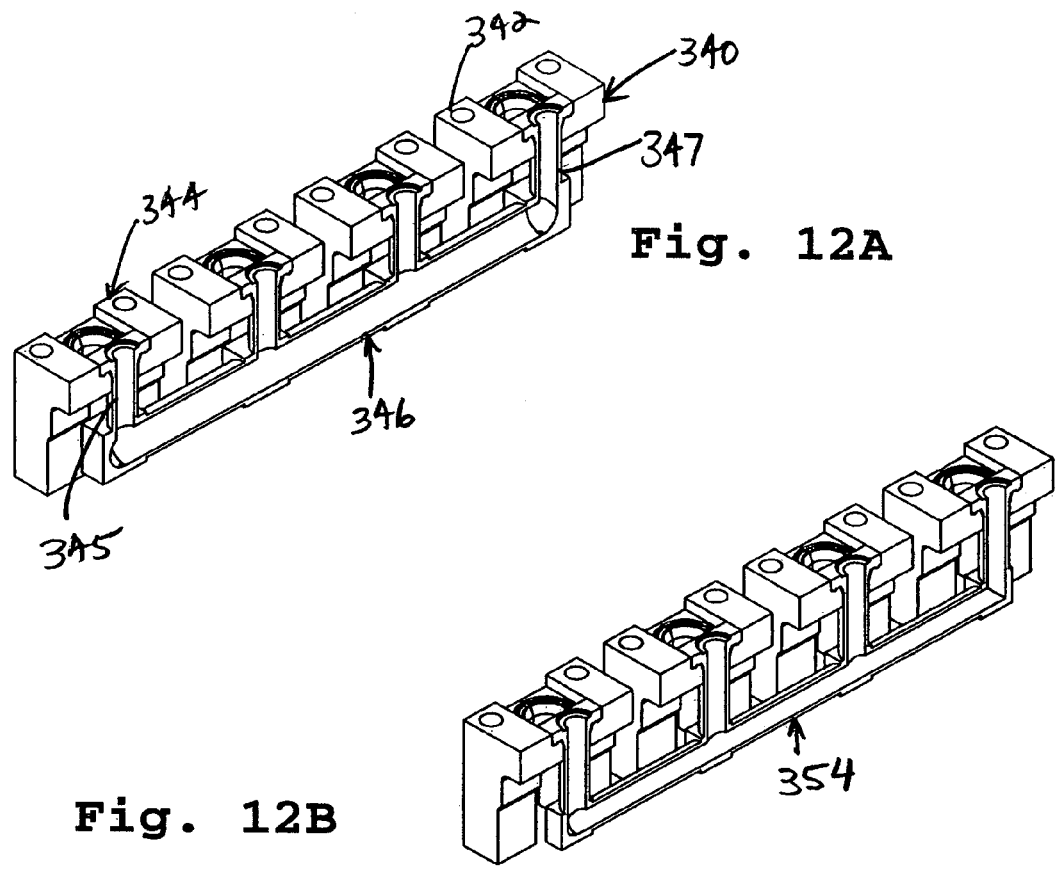
Fig. 12A
Fig. 12B
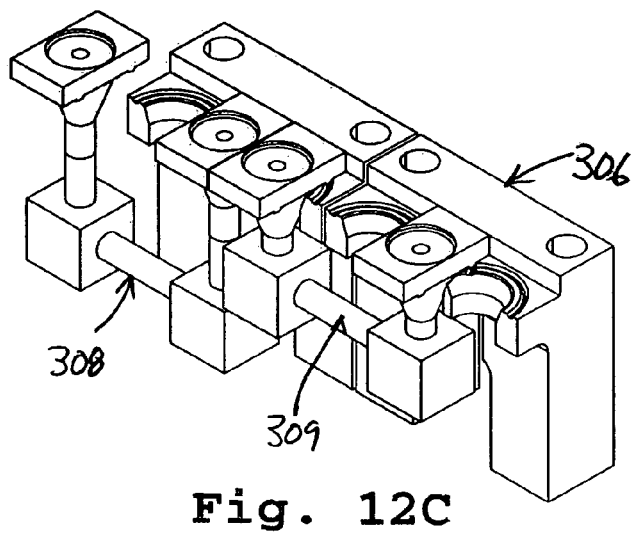
Fig. 12C

GAS-PANEL ASSEMBLY

This application is a continuation-in-part of U.S. application Ser. No. 10/823,974 filed Apr. 13, 2004 now U.S. Pat. No. 7,048,008, which is incorporated herein in its entirety by reference.

FIELD OF THE INVENTION

The present invention relates to a fluid manifold assembly, a gas panel employing such a manifold assembly, and components for constructing the manifold having a plurality of separate fluid-flow pathways.

BACKGROUND OF THE INVENTION

The manufacture of semiconductors involves using gases of very high purity such as oxygen as well as highly corrosive materials. These gases are controlled by fluid manifolds made up of valves, regulators, pressure transducers, mass flow controllers and other components that must maintain the purity of the gas, and also maintain resistance to the corrosive effects of the fluids. Currently, gas panels are used for mixing, pre-mixing, purging, sampling and venting the gases. Typically, the gas panel is used to provide a gas or a mixture of gases into a reaction chamber. These gas panels have historically been made up of hundreds of discreet or individual components, such as valves, filters, flow regulators, pressure regulators, pressure transducers, and connections. The fluid manifolds are designed to provide desired functions, such as mixing and purging, by uniquely configuring the various discreet components.

Modular manifold systems have been introduced into the industry in order to overcome these problems. A gas panel comprising a plurality of modular blocks with passages routed in the blocks is described by Markulec et al. (U.S. Pat. No. 5,836,355). Modular substrate blocks which have both directional and transverse flow direction capabilities united in a single modular substrate block are described by Hollingshead (U.S. Pat. No. 6,085,783). These modular systems were typically fashioned with the entire modular block made of high purity metal required for manufacture of semiconductors. Accordingly, these block components had high manufacturing costs due to the cost of the material and the complexity of machining multiple passageways of a single block.

A modular block using different materials for the fluid passageway and the block is described in Eidsmore et al. (U.S. Pat. No. 6,629,546). In this system, the manifold system includes one or more bridge fittings that are mounted within a channel of a backing plate for structural support or in a support block. Thus, the bridge fittings are supported from beneath. Ohmi et al. (U.S. Pat. No. 6,039,360) describes a gas panel having a holding member with a U-shaped cross-section and a channel member held by the holding member. A disadvantage of these systems is that the configuration of the system cannot be modified without taking the system apart.

The present invention thus seeks to provide a fluid manifold that is rapidly configurable, easily reconfigurable, and cost efficient.

SUMMARY OF THE INVENTION

In one aspect, the invention includes components for constructing a fluid manifold assembly having a plurality of separate fluid-flow pathways, where the manifold assembly is designed to be carried on a support, and to hold a plurality of fluid components in fluid communication with said pathways. The components include a plurality of pipe modules which form the fluid-flow pathways and which each includes an elongate pipe section and two or more connectors, each connector having a proximal end section joined in fluid communication with the elongate pipe section and a distal end section terminating at a collar. Also provided in the components is a plurality of block modules which can be placed together with one another and with the pipe modules to form the fluid manifold. Each block module provides (i) at least one groove formed therein, such that when two block modules are placed together, confronting grooves in the two modules form an opening in which a connector in a pipe module can be received, (ii) an upper surface region adjacent each groove, such when two block modules are placed together, confronting surface regions define a support surface for supporting the collar of a pipe module having a connector received in the opening, and (iii) structure for mounting the fluid components on said joined blocks, and for mounting said joined blocks on said support. The pipe modules are supported in the fluid manifold by their collars contacting the support surfaces formed by the block modules, allowing block or pipe modules to be removed and replaced without removal of adjacent block or pipe modules.

The pipe modules, but not the block modules, may be formed of a corrosion-resistant material, such as 304 stainless steel, 316L VIM-VAR, Hastelloy™, aluminum, or ceramic, and the block modules may be formed of less expensive materials, such as stainless steel or aluminum, that need not be corrosion resistant.

The pipe modules may be formed with block elbow connectors joining the elongate pipe section to the connectors, and different pipe modules in the components may have different-length connectors, allowing the block elbow connectors of adjacent pipe connectors in an assembled fluid manifold to be offset in the direction of the connector axes.

The elongate pipe section in each pipe module may be sufficiently compliant to accommodate variation in the vertical positions of collars of the same pipe module, when a pipe module is mounted on block modules.

Different pipe modules may have different inner diameters in their elongate pipe section and connectors. One of the connectors in a pipe module may have a narrowed diameter adjacent the associated connector collar, to restrict fluid flow through that module.

The components may additionally have a flange block having a collar adapted to be supported by the support surface formed by a pair of confronting block modules, and a block adapted to provide a plugged surface against which a fluid-carrying conduit in such a fluid component can be sealed.

The components may also include a pair of cross-manifold pipe modules designed to provide a fluid-flow pathway between adjacent manifolds, where each cross-manifold pipe module includes an elongate pipe section, a first connector having a proximal end section joined in fluid communication with the elongate pipe section and a distal end section terminating at a collar adapted to be supported by the support surface formed by a pair of confronting block modules, and a second connector having a proximal end section joined in fluid communication with the elongate pipe section and a distal end section terminating at a connector block adapted to be mated with the connector block in the other cross-manifold pipe module of the pair, to form an sealed connection between the two pipe modules.

In one general embodiment the support surface formed by two modules, when placed together, and the collar of a pipe module having a connector received in the opening formed by the two modules, have interlocking geometries that act to hold the two block modules together when force is applied on the collar against said support surface. The interlocking geometries may be arcuate tongue-in-groove geometries, where tongue-in-groove may refer, for example, to a pair of tongues formed on opposite sides of the collar and a pair of grooves formed in opposite sides of the support surface formed by the block modules.

The side of a collar opposite the side at which the collar contacts a support surface may have an annular recess for receiving an annular seal therein, for sealing the connection between the connector of that pipe module and a fluid component.

The pipe module collars may be substantially rectangular in shape with the long axis of the collar being adapted to bridge the surface regions defining the support surface, with two block modules placed together, and with a pipe-module connector received in the associated opening formed by the block modules. The surface regions of the block modules forming the support surface may be recessed and dimensioned to receive the rectangular collar of a supported pipe module therein.

The structure for mounting said fluid components on said joined blocks may be the same as the structure for mounting said joined blocks on said support.

In another general embodiment, the block modules include structure for holding blocks placed together in alignment with each other, and the structure for mounting the fluid components on the joined blocks may be separate from the structure for mounting said joined blocks on the support, such that mounting a fluid component to a block can be performed independently of mounting a joined block to the support.

The structure for mounting joined blocks on the support may include one or more slots formed in side regions of said blocks, each slot being adapted to receive a portion of a washer therein.

In another aspect, the invention includes a modular fluid manifold assembly formed of the above pipe modules and block modules, and a gas panel composed of the assembly and gas components mounted thereon.

These and other objects and features of the invention will be more fully understood when the following detailed description of the invention is read in conjunction with the accompanying drawings.

BRIEF DESCRIPTION OF THE DRAWINGS

FIGS. 2A–2C shows a modular block in a fluid manifold in perspective view (FIG. 2A), perspective, disassembled view (2B), and in sectional view through a sectional line 2C—2C in FIG. 1A (2C);

FIGS. 5A–5D are perspective and cut-away views of two different three-connector pipe modules;

FIGS. 7A–7F show a perspective view of steps employed in changing a manifold pipe-module configuration, in accordance with the invention;

FIGS. 12A–12C show portions of manifolds incorporating different pipe modules, the first two having four pipe connectors and relatively large (12A) and relatively small (12B) pipe-connector diameters, and the third having vertically offset elbows with small-diameter pipe connections (FIG. 12C);

DETAILED DESCRIPTION OF THE INVENTION

I. Definitions

The terms below have the following meanings unless indicated otherwise.

The terms "fluid manifold" and "gas panel" are used interchangeably, and refer to a system of elements, some including pathways, and fluid components to regulate, transport and/or control a fluid, liquid, and/or vapor.

The term "fluid" as used herein refers liquids, gases, and/or vapors.

An element is in "fluid communication" with another element when a fluid is able to travel from one element to the other via capillary action and/or gravity. The elements do not need to be in direct contact; i.e., other elements through which the fluid can pass may be intervening.

II. Fluid Manifold and Manifold Components

The manifold of the invention, and various components thereof, are illustrated in one general embodiment of the invention in FIGS. 1–7, and in another general embodiment of the invention in FIGS. 8–16. As noted above, the device described herein is particularly useful with high purity liquids, gases, and vapors, as used in manufacturing semiconductors. It will be appreciated, however, that the manifold will be useful for any application for providing, maintaining, or regulating liquid, gas, or vapor flow.

A. First Embodiment: Interlocking Block Configuration

Figure 1:
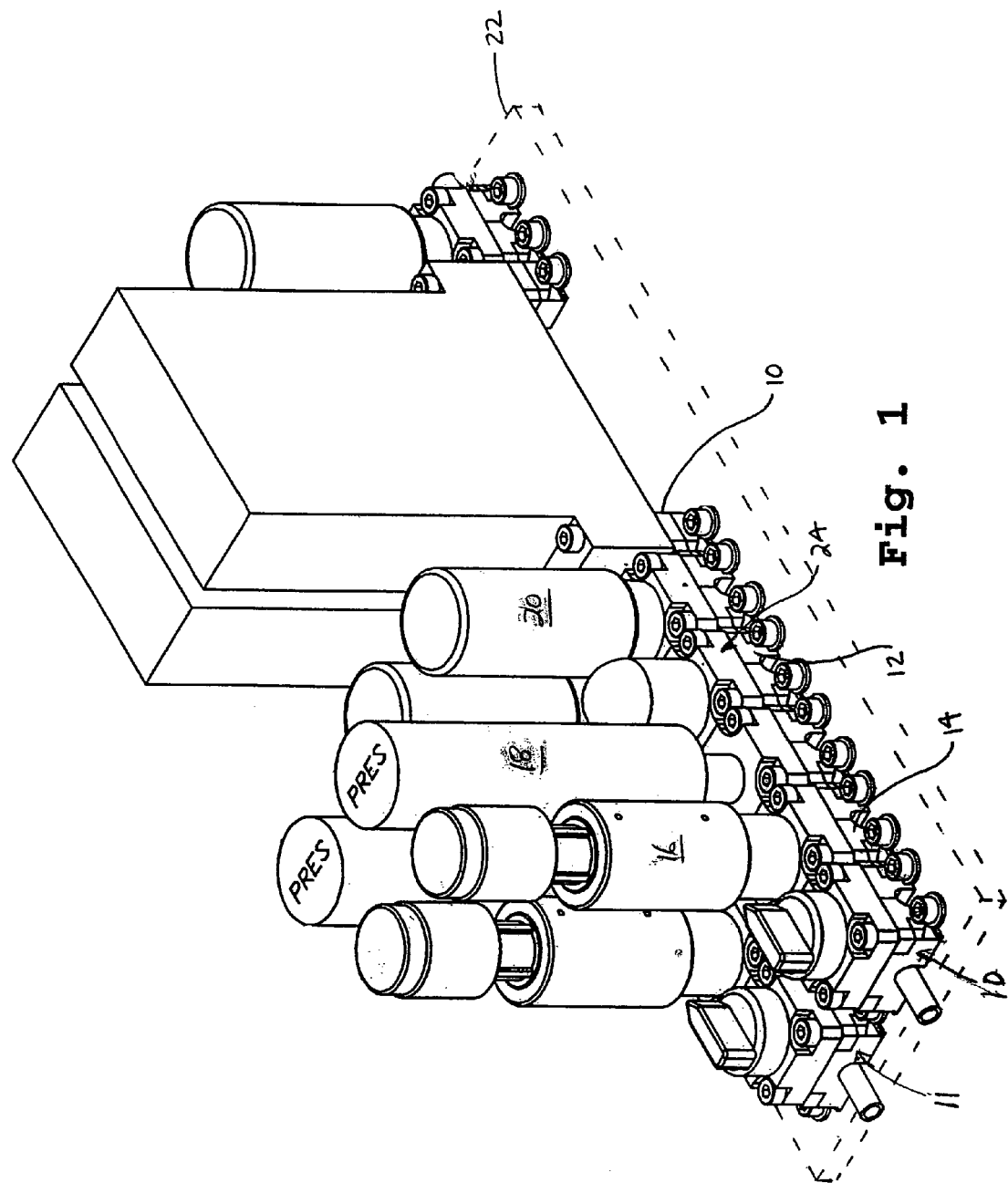
FIG. 1 is a perspective view of a fluid manifold assembly constructed according to one embodiment of the invention, and shown with representative fluid components, this embodiment being further also illustrated in FIGS. 2–7.
Figure 4A:
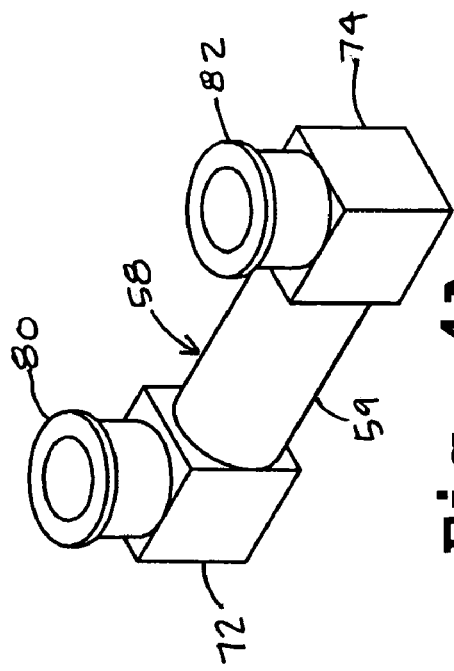
FIG. 4A–4B are perspective and cut-away views, respectively, of a pipe module having Microfit™ elbow connections.
Figure 4B:
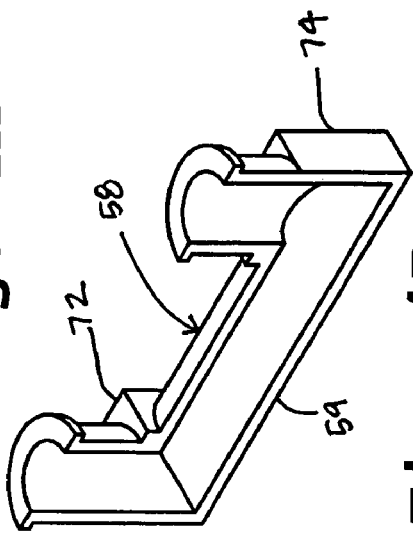

With reference to FIG. 1, the components described in detail below are shown in combination to construct a modular fluid manifold, such as manifolds 10, 11, constructed in accordance with a first general embodiment of the invention. As will be appreciated more fully below, each manifold is composed of a plurality of pipe modules (not seen) which form fluid pathways within the manifold, and a plurality of block modules, such as modules 12, 14. Manifold 10, which is representative, is shown assembled with fluid components, or accessories, such as components, 16, 18, 20 used in conjunction with the fluid manifold. These fluid components are typically flow controls or flow regulators including, but not limited to, valves, flow regulators, pressure regulators, pressure indicators/transducers, and filters. The fluid components may be in fluid communication with any number of various fluid components including fluid flow regulators, fluid sources, pressure transducers, fluid outlets, etc. The fluid components are typically mounted on the surface of the fluid manifold and include an inlet and/or outlet for fluid communication with the components of the fluid manifold. It will be appreciated that the fluid components may be directly or indirectly mounted on the fluid manifold. Where the fluid component is indirectly mounted on the fluid manifold, any number of components including seals, heaters, locators, retainers, and spacers may be positioned between the fluid component and the fluid manifold.

The manifold, and attached fluid components, are mounted on a base or support 22 which is shown in dotted lines. The support is typically wall-mounted or mounted on table legs to bring the support up to a convenient height for the user. The support here is shown mounting two manifolds 10, 11, each having internal fluid connections and which themselves may interconnected by pipe modules extending between the manifolds. Typically several manifolds will be mounted on a single support.

FIGS. 2A–2C illustrate a representative modular unit 24 in manifold 10. As seen in FIG. 2A four block modules, including modules 26, 28, 30, and 32, and three pipe modules 34, 36, 38 are utilized in forming the modular unit. FIG. 2A shows the unit in a fully assembled form, with each of the three pipe units supported within the structure formed by the four block units. At least two of the block modules forming a modular unit, such as block modules 26, 30, include a groove or cut-out section, such as groove 40 in module 26 and groove 42 in module 28, such that when two block modules are placed together, confronting grooves in the two modules form an opening in which a connector in a pipe module can be received.

Each groove in turn, may be recessed at the upper surface of the block module, such as recess 46 in module 28, recess 47 in module 26, and recess 52 in module 30, to provide a seat for a collar or flange, such as flange 48 in pipe module 36, to support the flanged end of the pipe module in the block unit, when the two confronting block modules, in this case, modules 26 and 28 are joined together with their grooves, such as grooves 40, 42, confronting one another. That is, the confronting grooves form an opening, such as opening 44 through which the distal pipe section is received, with the flange of the pipe support supported within and on the recess formed by the two grooves. More generally, each block module provides an upper surface region adjacent each groove, such as upper surface regions corresponding to recesses 46, 47 in block modules 28, 26, respectively, such when two block modules are placed together, the confronting surface regions adjacent each opening define a support surface, such as recessed support surfaces 45 formed by recesses 46, 47, for supporting the collar, e.g., flange, of a pipe module having a connector received in the opening.

The block modules are preferably formed of an inexpensive and/or lightweight material. Such materials include different grades of stainless steel, different grades of aluminum, ceramic, sintered metals, stamped metals, and forged metals. In a preferred embodiment, the block modules are formed of stainless steel or aluminum.

Each pipe module shown in FIGS. 2A–2C includes a free, unsupported end which will become supported by an adjacent block unit constructed adjacent unit 24 and also forming part of the manifold. That is, each pipe module is supported at one end within one modular unit, and at its other end by an adjacent unit. More specifically, and as will be described below, each pipe module includes a collar or flange, such as flange 48 supported in unit 24, and flange 49 supported in an adjacent module. The flanges, such as flanges 48, 49, 50, 54, are designed and dimensioned to be received in and supported on the support surfaces formed by the confronting modules, such as the recessed support surface formed by recesses 46, 47 in blocks 28, 26, respectively. It will be appreciated that the recesses in the support surfaces may be dimensioned such that the flange rests flush with the upper surface of the block module. Alternatively, the recess may be dimensioned such that the flange is recessed from the block module upper surface, not shown. In this embodiment, the flange may be recessed sufficiently to partially or wholly receive a seal, such as an o-ring, metal washer, C seal, W seal, or any other seal known in the art.

Figure 3A:
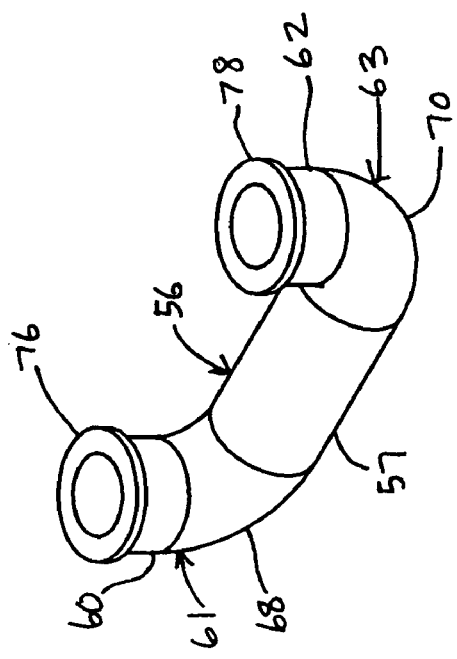
FIGS. 3A–3B are perspective and cut-away views, respectively, of a pipe module having curved elbow connections.
Figure 3B:
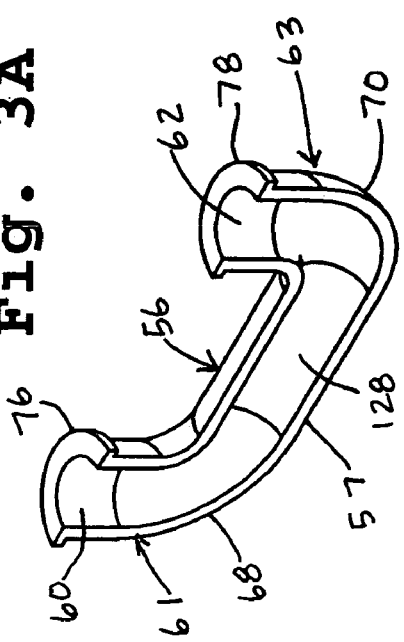

FIGS. 3A and 3B, 4A and 4B illustrate two different types of pipe modules, indicated at 56 and 58, respectively, suitable in the invention. FIGS. 3A–3B show a perspective and cut-away views of pipe module 56 whose fluid flow path is defined an elongate section 57 joined to connectors 61, 63 at either end. Each connector is formed of a distal end section, such as distal end section 60 in connector 61 and distal end section 62 in connector 63, and a proximal end section, such as proximal end section 68 in connector 61 and proximal end section 70 in connector 63 which joins the connector in fluid communication to the associated end of the elongate pipe section. Thus, each pipe module forms a fluid-flow pathway, indicated at 128 in pipe module 56 defined by the elongate pipe section and terminal connectors.

In the embodiment shown in FIGS. 3A–3B, the connector distal end sections include a formed, continuous pipe elbow. In the embodiment shown in FIGS. 4A–4B, the connector distal end sections include a Microfit™ elbow fitting 72, 74, joined to an elongate pipe section 59. It will be appreciated that the elongate section may be joined to a connector by any suitable fitting or bend pipe section.

As noted above, a distal end section of the connector includes a collar for supporting the pipe module at its opposite ends on associated support surfaces formed by the block modules. In this first embodiment of the invention, the collar is a flange, such as flanges 76, 78 in pipe module 56, and flanges 80, 82, in pipe module 58. In other embodiments, such as the embodiment described in Section B below, the collar is a rectangular support plate attached to the distal pipe end sections. Alternatively, the collar may take the form of one or more pins or a collar attached in the distal end section for engaging complementary support structure in the two block modules that will support the pipe modules.

The elongate section may be welded or otherwise permanently joined to the connectors, as described above. In another embodiment, a weldless system may be used, especially for an ultra clean application. The pipe module may further comprise two elbow type fittings joined together without an elongate pipe section, not shown. In yet another embodiment, all or part of the pipe module, including elongate member, connector sections, and flanges may be formed of a single piece, not shown. The elongate pipe section and connector sections are typically joined to form a U-shape or W shape (three connectors), however, other shapes are possible. In another embodiment, the pipe modules include one or more external connections that may serve as an inlet and/or outlet for connection of a fluid line or source, a waste or overflow receptacle, or the reaction chamber. The external connections may include any suitable fitting, such as a VCR connection, not shown, for connection to an external source, purge, receptacle, or waste.

For ultra-high purity embodiments, the fluid-flow pathway, such as pathway 128, may be internally electropolished and/or finished according to known methods to prevent corrosion and to provide an ultra-clean environment. In a preferred embodiment, all wetted surfaces including the fluid-flow pathway and flanges are electropolished.

The pipe modules may be formed of any material suitable for the application. For ultra-high purity applications, the pipe modules may be formed of high-grade stainless steel such as 304SS and 316SS, nickel alloys, sintered alloys, ceramic, high grade aluminum, tungsten alloys, and titanium alloys. In a preferred embodiment, at least the wet surfaces (flow path and the flange) of the pipe modules are formed of a non-corrosive, corrosion resistant, or non-reactive metal or alloy. In a more preferred embodiment, the pipe modules are formed of 316L VIM-VAR or an alloy such as Hastelloy™ (available from Haynes International). For industrial uses, any suitable plastic or metal is suitable. It will be appreciated that each of the elongate section, connector sections and flanges may be formed of a different material. It will further be appreciated that the block modules may, but need not be, formed of the same material as the pipe modules. In fact, one important advantage of the invention is that the pipe modules, which are exposed to corrosive gases and other fluids, may be formed of high-quality, and typically more expensive metal or metal alloys, while the block modules, which are not exposed to corrosive fluids, may be formed of relatively inexpensive material, such as different grades of stainless steel, different grades of aluminum, ceramic, sintered metals, stamped metals, and forged metals. In a preferred embodiment, the block modules are formed of stainless steel or aluminum.

As above, the pipe modules may have other configurations in response to the necessary functions of the fluid manifold. FIGS. 5A–5B show a perspective and cut-away view of a three-connector pipe modules 84 having both end and internal connectors 94, 96, 98 as shown, and two elongate pipe sections, such as sections 86, 87, each being connected at an end to one of the connectors, as shown. As seen in FIGS. 5C–5D the pipe module may include a combination of fittings. In this embodiment, a pipe module 105 includes a pair of elongate pipe sections 106, 108, each joined to an end connector, such as connector 110, through an elbow joint and to an internal connector, such as connector 112, through another type of fitting. The three-connector pipe modules just illustrated is used where it is desired to have two input gases enter and mix in a single pathway, or a single gas input distributed to two different gas accessories.

With further reference to FIGS. 2A–2C, the block modules in the present general embodiment may include structure for holding the block modules in alignment with each other. In one embodiment, the structure for holding the block modules in alignment includes at least one alignment pin, such as pin 130 and a cavity or recess, such as recess 132 for receiving the pin on an adjacent block module, such that when the block modules are joined, the alignment pin is at least partially retained in the cavity. In another embodiment, seen in FIG. 2B, the block modules may be formed to include overlapping sections, such as sections 134, 136 such that when two block modules are joined or mated, the sections at least partly overlie each other. It will be appreciated that the block modules may include more than one of the same type of alignment structure.

As described above, the fluid components are designed to be mounted on the upper surface of the modular-block manifold. In one embodiment, the block modules include structure for mounting the fluid components on the upper surface of joined blocks. In a preferred embodiment, the block modules include slots, such as slots 138, 140 for fastening the fluid component to the block module. In one embodiment, the top slot, such as slot 138, may have a smooth bore, to allow insertion of a bolt and at least a part of the lower slot to be threaded for fastening the bolt. Fasteners pass through openings in the base of the fluid components to secure the fluid components to the block modules. In a further embodiment, the screw or bolt passes through both block slots, such as slots 138, 140 and block modules, such as modules 30, 32 and is secured directly to base 22. In this embodiment, structure for mounting a gas component to the manifold is also the structure used in mounting the manifold on a base.

Figure 6C:
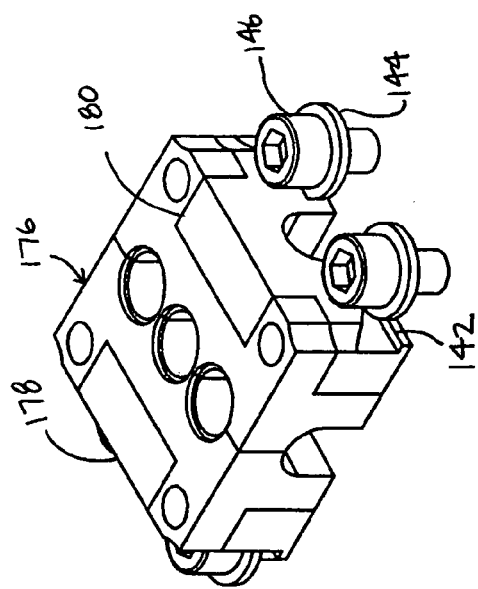
FIGS. 6A–6C show an embodiment of structure used in mounting a manifold block to a support.
Figure 6B:
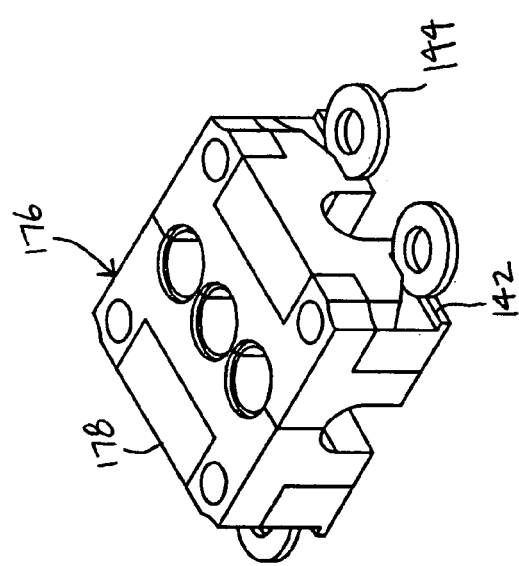
Figure 6A:
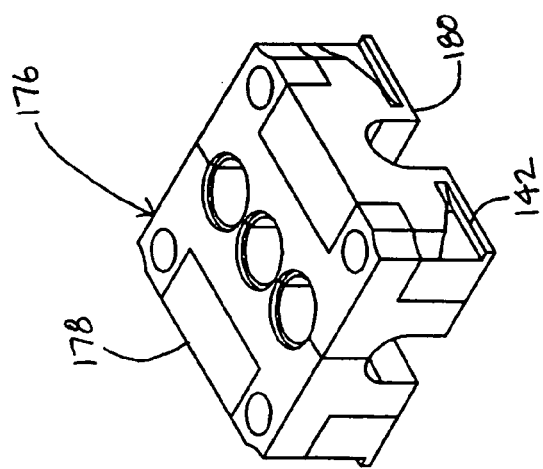

As illustrated in FIGS. 1, and 6A–6C, the block modules may include separate structure for mounting the module units 176 to the support, base plate, or back plate 22, shown in FIG. 1. As seen in FIG. 6A–6C, the mounting structure may include a ledge or slot 142 formed in a side region of at least some of the blocks 178, 180 for mounting the block module, and thus the module unit, to the back plate. In this embodiment, each slot is adapted to receive a portion of a washer 144 or other suitable component such that the washer at least partially overlaps the ledge on the block module. The washer is fastened to the base plate by a fastener 146 or any other suitable means including clamps, pins, and screws. In a preferred embodiment, the block units are secured at each corner to the base plate with the mounting structure 146.

The base plate will typically be a flat, rectangular plate, but can be any suitable shape or configuration. The width of the base plate is sized to accommodate at least one block module. Alternatively, the width may be sized to accommodate two or more block modules (as in FIG. 1). Alternatively, two or more base plates may be used in combination, where the base plates are either adjacent or placed end to end, to form the fluid manifold. The length of the base plate is sized according to the number of block modules required for the fluid manifold. It will be appreciated that two or more fluid manifolds may be connected. The base plate will typically include at least one cavity for receiving the module unit fastener 146. The base plate may be comprised of any suitable material, including, but not limited to metal and metal matrix composites. The base plate is preferably comprised of an inexpensive and/or lightweight material such as aluminum or stainless steel. In another embodiment, the base plate is comprised of plastic.

In another embodiment, the fluid manifold may be assembled as a multi-level manifold having two or more levels. In this embodiment, the fluid manifold is assembled as previously described with some modifications. The multi-level manifold includes an upper base plate and a lower base plate each with a fluid manifold assembled thereon. The upper and lower base plates may be separated by optional support blocks. The levels of the fluid manifold may be in fluid communication using a pipe module that connects the upper and lower levels. The upper and lower base plates may be fastened by any known means including clips, clamps, bolts and/or screws.

The present invention allows for convenient reconfiguration of the unit modules. That is, it allows configuration of the manifold to be modified, e.g., to introduce another type of pipe module, without having to remove or adjust the position of adjacent block module, i.e., only those block modules that directly support a pipe module or which need to be replaced to support another type of pipe module, need to be removed. This feature is illustrated in FIGS. 7A–7F, which show a block unit 145 composed of four block units 162, 164, 166, and 169, and providing two openings 168, 170 for supporting connector ends of pipe modules 158, 160, respectively. In the particular example illustrated, it is desired to add a third pipe module 170 to the manifold adjacent these two pipe module ends, as shown at FIG. 7F.

To make this modification to the manifold, the fluid component on the block unit, if present, is first removed from upper surface of the block module. To remove block module 162, any structure for mounting the block module to the support or back plate is removed. Block modules 162, 164 are then removed, as illustrated in FIGS. 7B and 7C, respectively. A block module 172 having grooves for receiving three pipe modules, as seen in FIG. 7D, is then added, with attachment of this module acting to secure pipe modules 158, 160 in the manifold. The additional pipe module 170 is then added, as in FIG. 7E, and this pipe is secured in place and supported by attachment of a new block module 174 to the manifold, as shown in FIG. 7F.

It will be appreciated that any number of block modules and/or pipe modules may be removed and/or added to form the required configuration. In the present example, is noted that the existing pipe modules 158, 160 were not disturbed or removed and the configuration of the adjacent block modules was not changed. In particular, because the pipe modules are supported only at their upper connector ends, rather than internally within the block at their elongate pipe sections, it is possible to perform a number of modifications and replacements with without needing to remove existing pipe modules and/or to remove underlying block modules.

B. Second Embodiment: Interlocking Block Configuration

Figure 8:
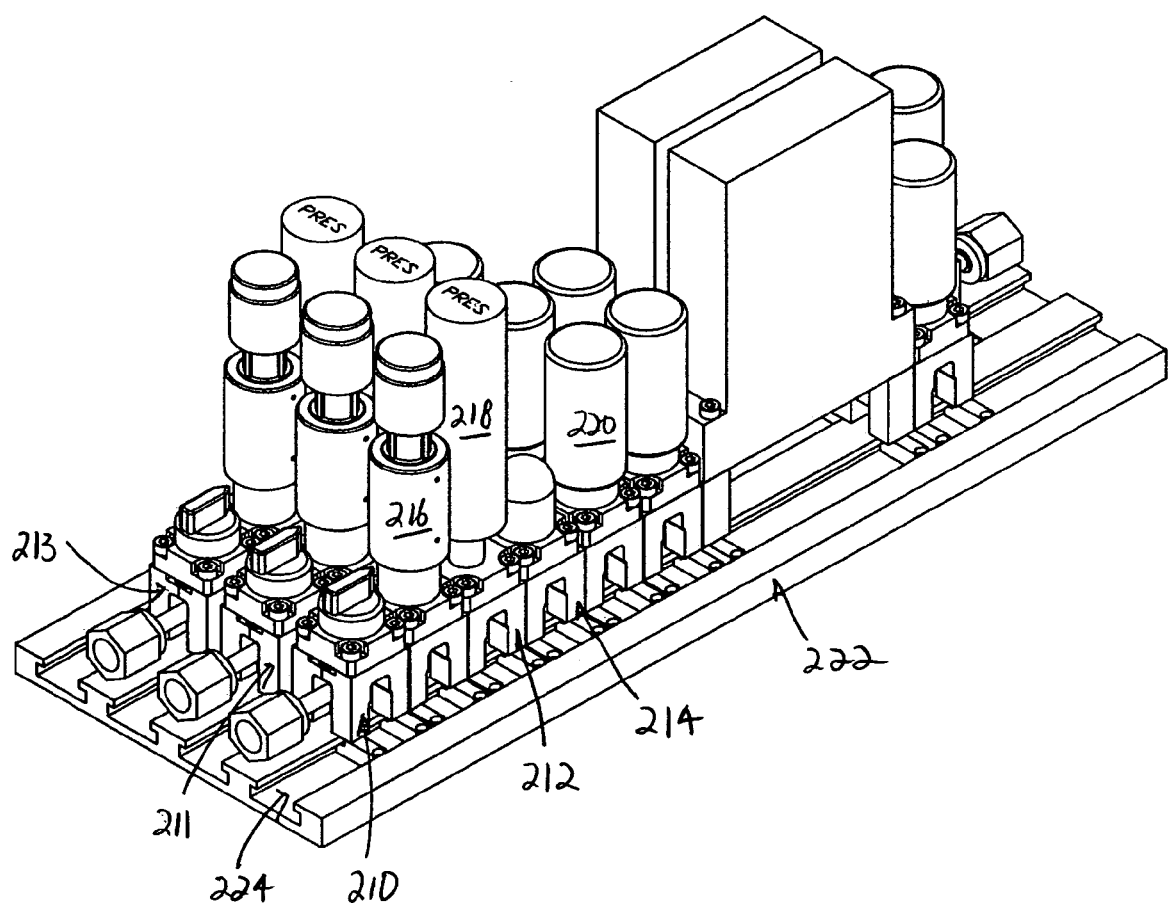
FIG. 8 is a perspective view of a fluid manifold assembly constructed according to another embodiment of the invention, shown with representative fluid components, this embodiment being further illustrated in FIGS. 9–16, FIGS. 9A–9C show a pair of pipe modules and block modules in pre-assembled (FIG. 9A) and assembled (FIG. 9B) form; and an enlarged cutaway view of the pipe modules in the modular unit shown in FIG. 9C, taken along the section line 9C—9C in FIG. 9B.

With reference to FIG. 8, the components described in detail below are shown in combination to construct modular fluid manifold, such as manifold 210, 211, and 213, each constructed in accordance with a second general embodiment of the invention. Like manifold 10 described in Section A above, the manifolds here, such as manifold 210, are each is composed of a plurality of modular units, such as units 212, 214, each composed of pipe modules (not seen) which form fluid pathways within the manifold, and a plurality of block modules, such as modules which support the pipe modules and anchor the pipe modules and fluid components in place. The manifolds are shown assembled with fluid components, or accessories, such as components, 216, 218, 220 in manifold 210, used in conjunction with the fluid manifold, similar to components 16, 18, 20 described above. As above, fluid components may be in fluid communication with any number of various fluid components including fluid flow regulators, fluid sources, pressure transducers, fluid outlets, etc, and are typically mounted on the surface of the fluid manifold and include an inlet and/or outlet for fluid communication with the components of the fluid manifold.

The manifold, and attached fluid components, are mounted on a base or support 222 which provides, for each manifold, U-shaped track, such as track 224, used for mounting a manifold, such as manifold 210 on the support, as will be described below with respect to FIGS. 16A–16D. The support is typically wall-mounted or mounted on table legs to bring the support up to a convenient height for the user.

Figure 9A:
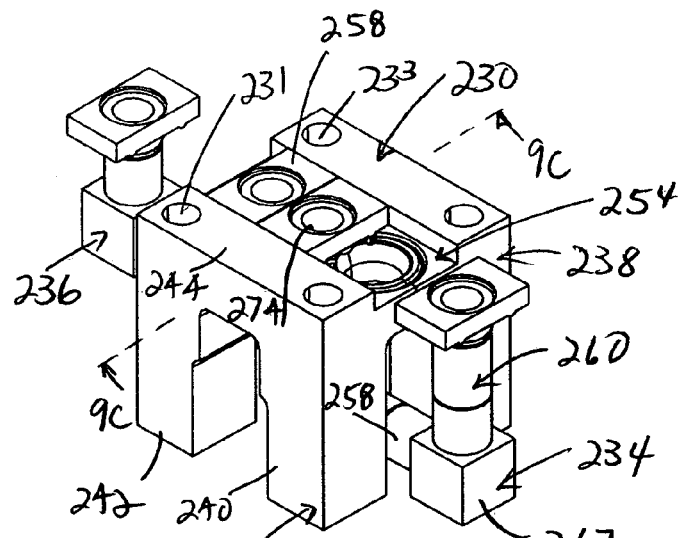
Figure 9B:
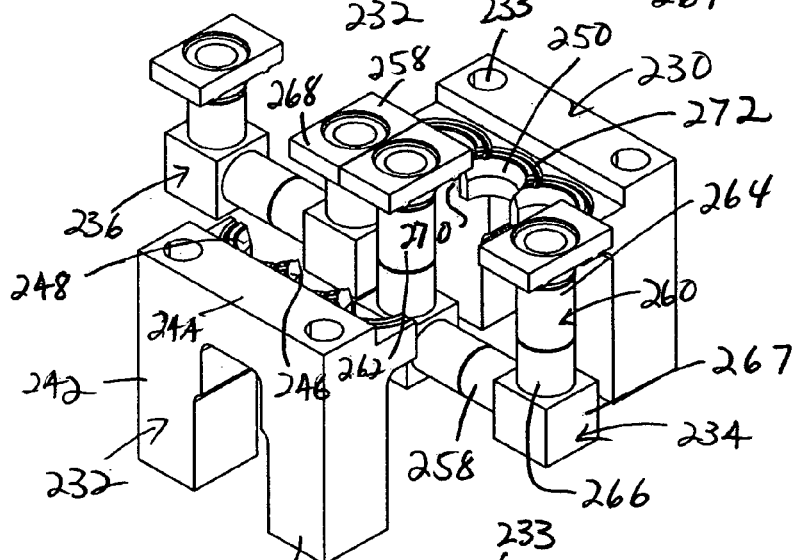
Figure 9C:
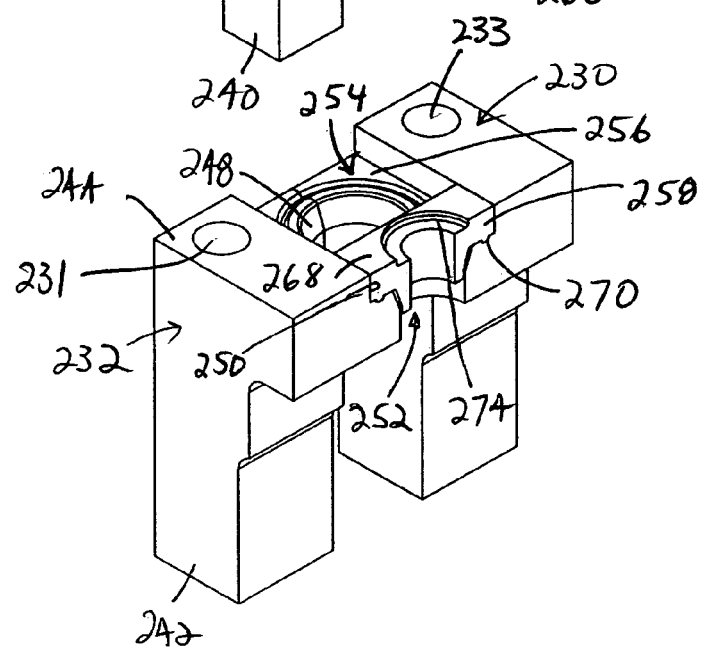

FIGS. 9A–9C illustrate the basic block modules and pipe modules used in forming a manifold in accordance with this second general embodiment of the invention. Shown in FIGS. 9A and 9B are two block modules 230, 232 that together with pipe modules 234, 236, form one of the interconnected modular units, such as unit 238, making up the manifold of the invention. As seen best in FIG. 9A, each block module, such as module 232, has the general shape of an inverted U formed of a pair of supporting legs 240, 242, and an upper bridge 244 spanning the legs. Particulars of the bridge can be seen best in FIG. 9C, which shows two block modules 230, 232 placed together, as in FIG. 9B, but sliced in two along a section line indicated at 9C—9C in FIG. 9B. As seen in this figure, bridge 244 in block module 232 includes a plurality of semi-circular grooves or cutouts, such as grooves 246, 248, such that when two block modules are placed together, opposing grooves in the block modules each form a cylindrical opening, such as opening 252 formed by grooves 246 and 250 in block modules 232, 230, respectively. Each block module also includes a pair of vertical openings, such as openings 231, 233 in blocks 230, 232, respectively, used for mounting the blocks of a panel support, as will be described.

With continued reference to FIG. 9C, the central upper surface of each block is notched along its lengths, such when two block modules are placed together, their upper surfaces form a rectangular channel, such as channel 254, extending along the upper surface of a modular unit formed by two block modules. As will be seen below, this channel forms a support surface, such as surface 256 in channel 254, for supporting rectangular-shaped collars of the pipe module(s) whose pipe connectors are received in the associated opening formed by the block modules. This is seen best in FIG. 9B, which shows a portion of a pipe collar 258 in a pipe module whose pipe connector (not shown) is received in the central opening formed by the two block modules, and whose collar is supported on surface 256 within the rectangular channel formed by the two block modules. Thus, in an assembled manifold, each pipe module is supported at its opposite end connectors (and optionally, at internal connectors as well, as will be seen in FIGS. 12A and 12B) by its two or more pipe-module collars resting on two or more support surface formed by confronting pairs of block modules. Typically, a pipe module is contained within and supported by two or more different modular units.

As seen best in FIG. 9B, pipe module 234 has the same general construction as the pipe modules described in Section A above. Briefly, the pipe module has a fluid-flow path defined an elongate section 258 joined to connectors 260, 262 at either end. Each connector is formed of a distal end section, such as distal end section 264 in connector 260, and a proximal end section, such as proximal end section 266 in connector 260 which joins the connector in fluid communication to the associated end of the elongate pipe section. As described above with reference to FIGS. 2A–2C, the pipe modules may be formed having the connector distal end sections including a formed, continuous pipe elbow. In the embodiment shown in FIGS. 9A–9C, the connector distal end sections include an elbow fitting, such as a Microfit™ elbow fitting, shown at 267, joined to an elongate pipe section 258. It will be appreciated that the elongate section may be joined to a connector by any suitable fitting or bend pipe section.

As noted above, a distal end section of the connector includes a collar for supporting the pipe module at its opposite ends on associated support surfaces formed by the block modules. In this second general embodiment of the invention, the collar structure is preferably a rectangular flange or plate, such as plate 268 at the distal end of connector 260 in pipe module 234. As noted above, this flange or collar may have a variety of shapes, including a plurality of pins or projections, as long as the collar provides structure which can contact the block module support surface, when the corresponding pipe connector is received in a block module opening, to support that end of the pipe module on the support surface formed by the two confronting block modules. The general construction of the pipe modules, including preferred material for its construction, is as described above in Section A.

Looking again at 9C, the block-module support surfaces, when placed together, and the collar of a pipe module having a connector received in the opening formed by the two modules, have interlocking geometries that act to hold the two block modules together when force is applied on the collar against the support surface, as when a fluid component is attached to and sealed against the upper surface of the collar, in placing and sealing a fluid component on the manifold.

In the embodiment illustrated, the interlocking geometries take the form of arcuate tongue-in-groove geometries, where tongue-in-groove refers to a pair of arcuate, e.g., semicircular, tongues, such as tongue 270, formed on opposite sides of a pipe-module collar, and complementary arcuate grooves, such as groove (FIG. 9B), formed on in each block-module support surface. As can be appreciated, when a collar is placed against a support surface, its two arcuate tongues are received in the associated grooves in opposite, confronting block modules. Thus, a force applied to the collar acts to lock the surface regions of the two block modules together, rather than acting to spread the modules apart. It will be appreciated that the locking structure may take a variety of forms, only requiring that the two confronting surface of the collar of block-module support surface have complementary interlocking surface features.

Completing the description of what is shown in FIGS. 9A–9C, the upper surface of each pipe-module collar has formed therein, an annular ring or recess, such as recess 274 formed in the upper surface of the collar, designed for receiving a seal that will be used in sealing a pipe end in a gas component to the pipe connector in that pipe module.

Similar to the modular units described above in Section A, the pipe modules in this embodiment may, where corrosive gases are to be used, be formed of a high-quality corrosion-resistant metal or metal alloy, such as 316L VIM-VAR or an alloy such as Hastelloy™ (available from Haynes International), while the block modules may be formed of a less expensive, less corrosion-resistant material, such as stainless steel aluminum, or a high-strength plastic.

Figure 10A:
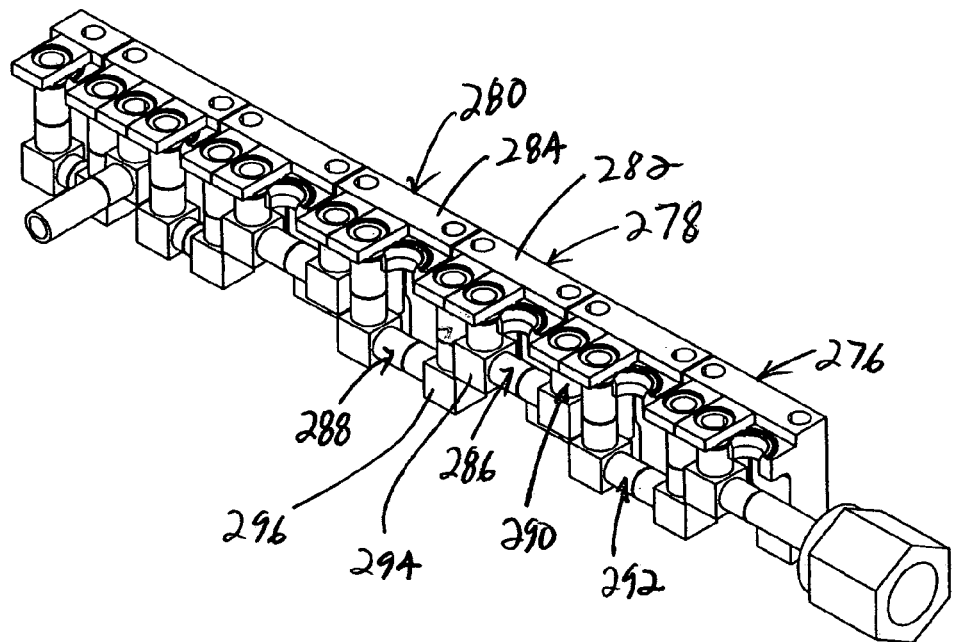
FIGS. 10A and 10B are cutaway perspective views of manifolds constructed in accordance with the invention, each composed of a plurality of modular units, and shown here with one of the two block modules in each unit removed to reveal the interior pipe modules, where the two figures show pipe modules with vertically offset elbows (FIG. 10A) and vertically aligned elbows (FIG. 10B)

As above, the pipe modules may have a variety of configurations in response to the necessary functions of the fluid manifold. FIG. 10A shows a perspective, and cut-away view of a manifold 276 composed of a plurality of modular units, such as units 278, 280 formed of block modules, such as modules 282, 284, respectively. Only one of the two block modules forming each modular unit is shown; the other one has been removed to expose the pipe modules, such as modules 286, 288, carried by the block modules. The particular configuration of pipe modules shown here is intended to illustrate a close-packing arrangement of pipe modules that can be achieved while still accommodating the relatively bulky pipe fittings used in connecting the pipe segments in the pipe modules. This is done, in the embodiment illustrated, by providing some pipe modules, such as module 286, with relatively short pipe connectors, such as connector 290, and providing adjacently placed pipe modules, such as modules 288, 292, so that the fittings in adjacent pipe modules, such as fittings 294, 296 are vertically offset allowing them to overlap laterally.

Figure 10B:
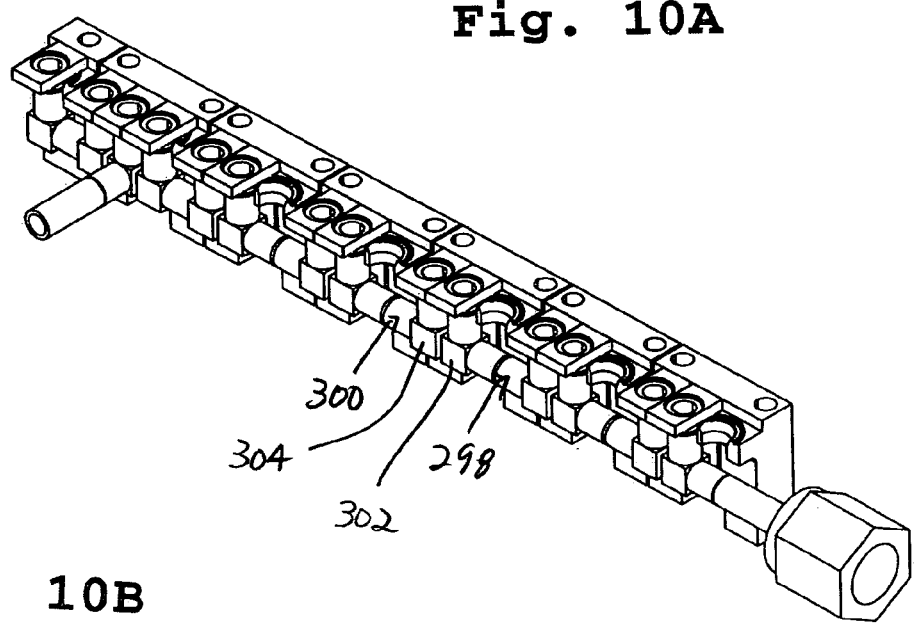

Where, as in FIG. 10B, the pipe modules, such as modules 298, 300, are designed with smaller fittings, or where the adjacent pipe modules are more widely spaced, the pipe modules may all have same-length connectors, with adjacent fittings, such as fittings 302, 304, being laterally accommodated with vertical offset.

Figure 11:
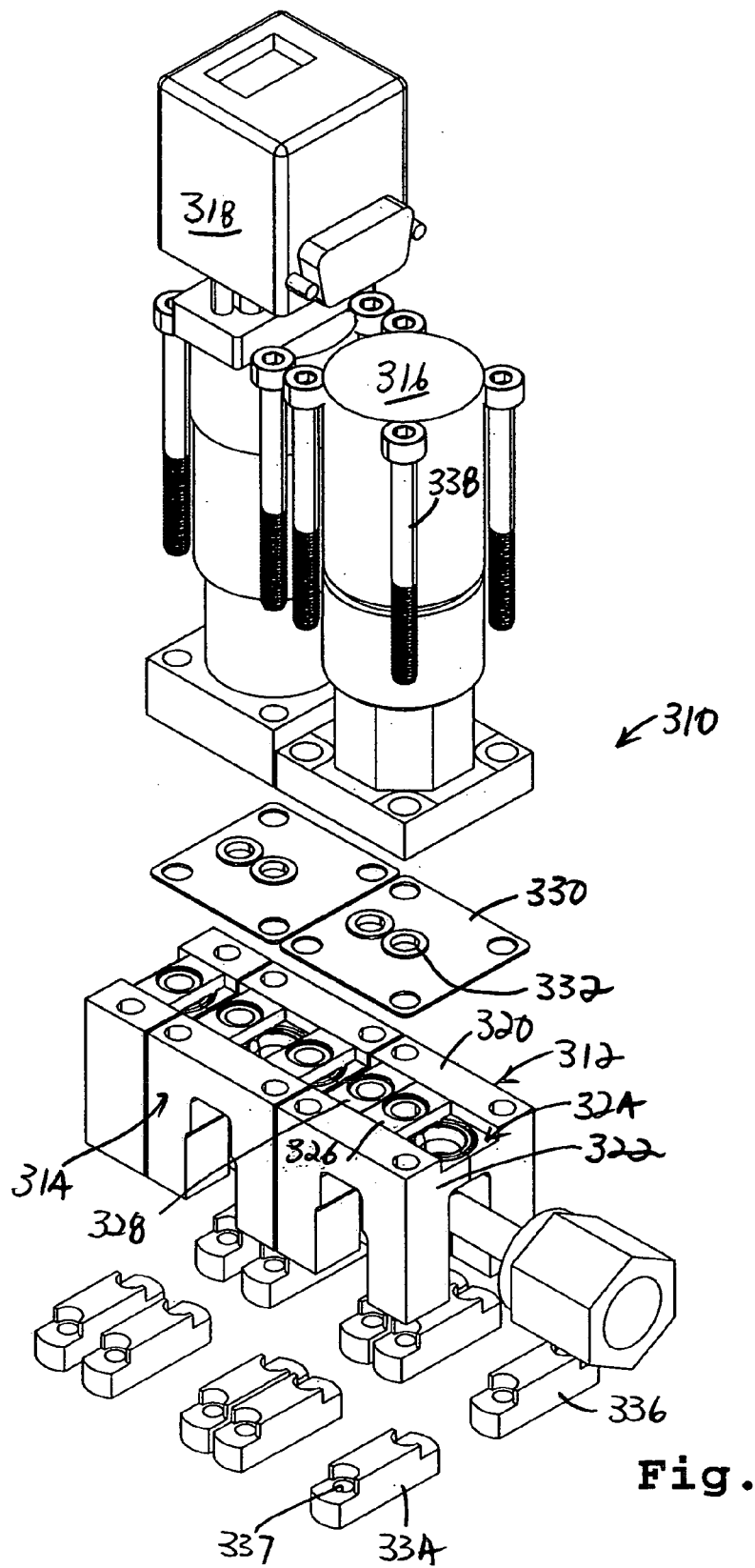
FIG. 11 is an exploded perspective view showing the mounting of two gas-panel components on a portion of a gas-panel assembly formed in accordance with the second general embodiment of the invention, and the mounting of assembly components on a support.

FIG. 11 is a view of a portion of a gas panel 310 constructed on a manifold formed with the block module and pipe module components of the invention, similar to what is shown in FIG. 8, but shown here with two modular units 312, 314 and their gas components 316, 318, respectively, in disassembled form, to illustrate how the gas panel is assembled from the components of the invention.

Modular unit 312, which is representative, is composed of a pair of block modules, 320, 322 which together form an upper support surface 324 for supporting collars of different pipe modules, such as collars 326, 328 on different pipe modules. A gasket assembly, such as gasket assembly 330 holds one or more washer gaskets, such as washer gasket 332, which are aligned with corresponding recesses in the pipe-module collars, as shown, so that in the assembled gas panel, the washer seals the junction of a gas-panel conduit with the corresponding pipe module connector.

The modular unit and gas components are mounted on a support through nut plates, such as plates 334, 336, which are held in a manifold support as can be seen in FIG. 8 and as will be described more fully below with respect to FIGS. 16A–16D. These plates have threaded sleeves, such as shown at 337, in which threaded assembly bolts, such as bolts 338 can be secured.

To assemble the gas panel, the nut plates are placed in panel support, as shown in FIG. 8, and the individual modular units, such as units 312 and 314, each composed of a pair of confronting block modules and one or more pipe modules, are placed on the plates and the units then arranged so the pipe module collars are positioned for locking to the corresponding support surfaces, e.g., through the tongue and groove configuration described above. With the modules so arranged to form a desired manifold, and with the washer gaskets arranged on the associated modular units, as indicated, the gas components and modular units are secured to one another and to the support by tightening the assembly bolts on the nut plates.

As indicated above, the assembly bolts are tightened with enough force to produce a gas-tight seal between the individual gas components and associated pipes in the pipe modules, that is, with enough force to deform the seals located there between. As can be appreciated, this force acts to lock pairs of confronting block modules together, to keep their surface from spreading, and at the same time, keeps the pipe modules positioned and aligned as the assembly bolts are tightened. The assembly bolts, the openings in the block modules through which the bolts are received, and the nut plates which receive the bolts and lock the manifold components and gas components to the support are also referred to herein, collectively, as structure for mounting the fluid components on the block modules and for mounting the block modules on the support.

It will be appreciated from the above that the manifold so formed allows pipe modules and block modules to be interchanged, e.g., to form a new configuration of gas-carrying pathways, by removing only certain bloc modules and/or pipe modules as needed, without the need to disassemble other gas components and/or modular units in the gas panel.

FIGS. 12A and 12B are cutaway perspective views of a portion of a manifold carrying a four-connector pipe unit carried therein. Manifold 340 in FIG. 12A is composed of at least four modular units, such as units 342, 344, for supporting a four-connector pipe module 346 at the four connector collars, such as collars 345, 347. FIG. 12B shows a similar arrangement for a four-connector pipe module 354, but where the diameter of the connector pipe in the module is substantially smaller than that shown in FIG. 12A, further illustrating how the present invention allows for a variety of pipe module configurations and fluid-carrying capacities.

FIG. 12C shows a portion of a manifold 306 with yet another pipe module configuration. Here adjacent pipe modules, such as modules 308, 309, have different-length pipe connectors, to allow lateral overlap of the fitting, as above, and also have narrow pipe sections for restricting fluid flow through pipe modules. Of course, in any manifold, pipe modules with both different pipe-section diameters and different-length pipe connectors can be used.

Figure 13A:
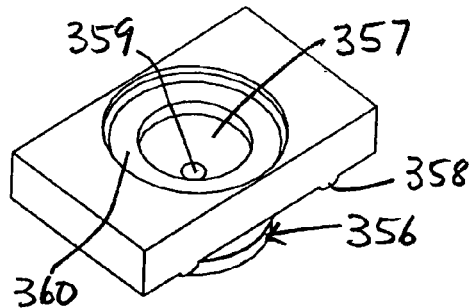
FIGS. 13A and 13B are enlarged views of the collar portion of a pipe module have a fluid flow restrictor (FIG. 13A) and a cap block for capping fluid flow from a gas panel component (FIG. 13B)

FIG. 13A shows the upper portion of a pipe connector 356 is a pipe module intended to function as a fluid-flow restrictor in the manifold of the invention. The connector includes a restrictor 357 having a narrow opening 359 between a gas component connected to the pipe module and the pipe sections in the module, to limit the rate of flow of fluid across the restrictor. Also seen here in enlarged scale are the arcuate tongues, such as tongue 358, used to lock the collar to opposite grooves in the support surface formed by a pair of block modules, and a recess 360 formed in the upper collar surface for receiving a washer used in sealing a gas component to the pipe connector.

Figure 13B:
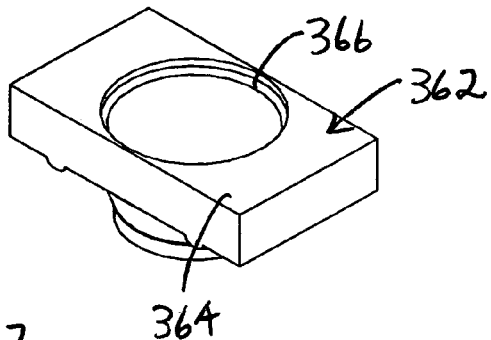

FIG. 13B shows a block plug 362 intended for use in plugging a pipe connection from a gas component carried on a manifold of the invention. This simple component includes a collar 364 designed to be placed on a modular unit where a plug is desired, and an upper recess 366 at which a gas component pipe can be connected and plugged.

Figure 14A:
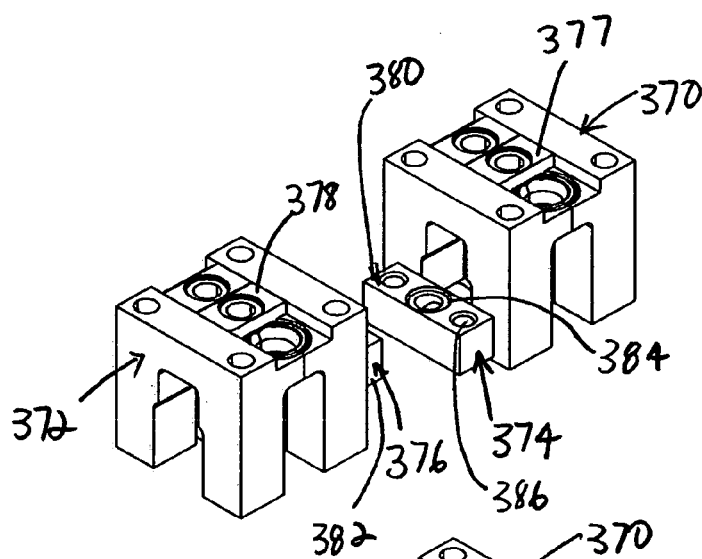
FIGS. 14A and 14B illustrate pipe modules for connecting two adjacent manifolds in the invention, shown in disassembled and assembled form, respectively.
Figure 14B:
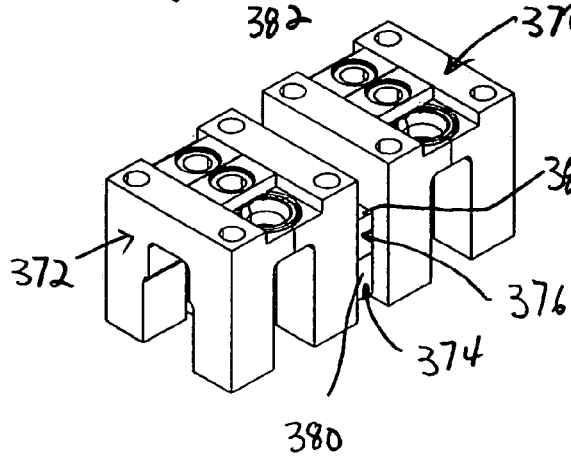

FIGS. 14A and 14B illustrate a pair of cross-manifold modular units 370, 372 having pipe modules 374, 376, respectively, designed for producing a fluid-flow pathway between adjacent manifolds. That is, modular unit 370 is one of is the units in a first manifold, such as manifold 210 in FIG. 8, and modular unit 372 is one of the units in a second manifold, such as manifold 211, and the pipe modules 374, 376 carried in this two units create a fluid pathway between the two units, and thus between the two manifolds.

Pipe modules 374, 376 have a construction similar to the two-connector pipe modules described above, each having a horizontally extending pipe section (not seen) connected at one end to the proximal end of a vertically extending pipe connector that terminates at its distal end in a collar, seen at 377 in module 374 and at 378 in module 376. This end of each pipe module is supported in modular unit 370 and 372, respectively, exactly as described above. The opposite end of the pipe section in each pipe module is joined to a connector block, such as block 380 in module 374 and block 382 in module 376. The two blocks are vertically spaced, as seen best in FIG. 14B, such that in the assembled manifolds, the two blocks overlap as shown.

Block 380, which is representative, has an upwardly facing recess 384 flanked by a pair of openings, such as opening 386 extending through the block. Block 382 is similarly formed but has a downwardly facing recess for mating with recess 384 through a sealing washer placed between and in the two confronting recesses, and fastened together by pins placed between the block openings, to forma a sealed connection between the two pipe modules, and thus between their associated manifolds.

Figure 15A:
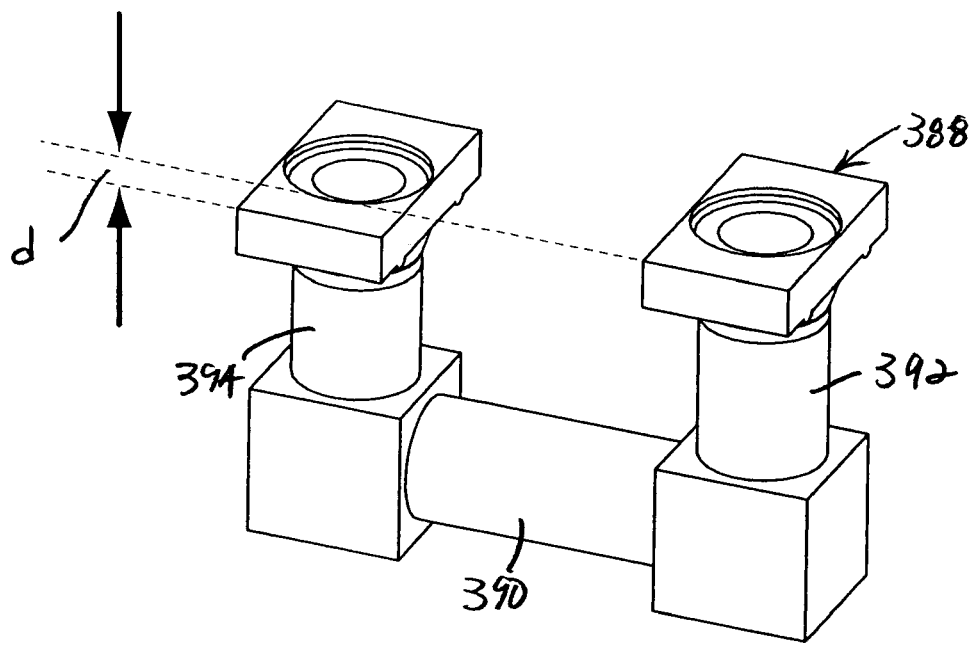
FIGS. 15A and 15B illustrate in exaggerated vertical scale, how the pipe modules of the invention can accommodate variations in the support positions of their two collars.
Figure 15B:
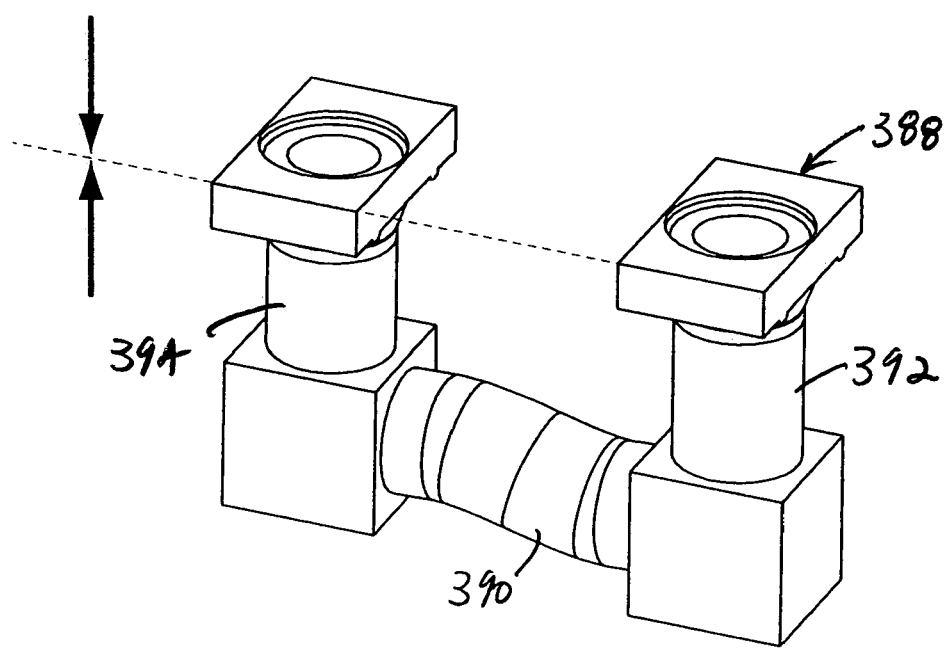

FIGS. 15A and 15B show a pipe module 388 having a pipe section 390 joined at its opposite ends to connectors 392, 394, as detailed above. The figures illustrate how minor variations in the support height between the two ends of the pipe module, and indicated in exaggerated vertical scale at d in FIG. 15A, can be accommodated by bending in pipe section 390, shown in exaggerated scale in FIG. 15B. These variations in support height may be due, for example, to variations in the vertical disposition of adjacent block module support surfaces, variations in collar thicknesses and/or variations in connector lengths. The figures thus indicate how imperfections in vertical dimensions in the components or panel-support surface in the manifold can be accommodated without angular distortion between the support surfaces and pipe-module collars in the modular units, allowing for effective seating of the collars on the block-module support surfaces, and effective sealing of the gas components to the manifold.

Figure 16A:
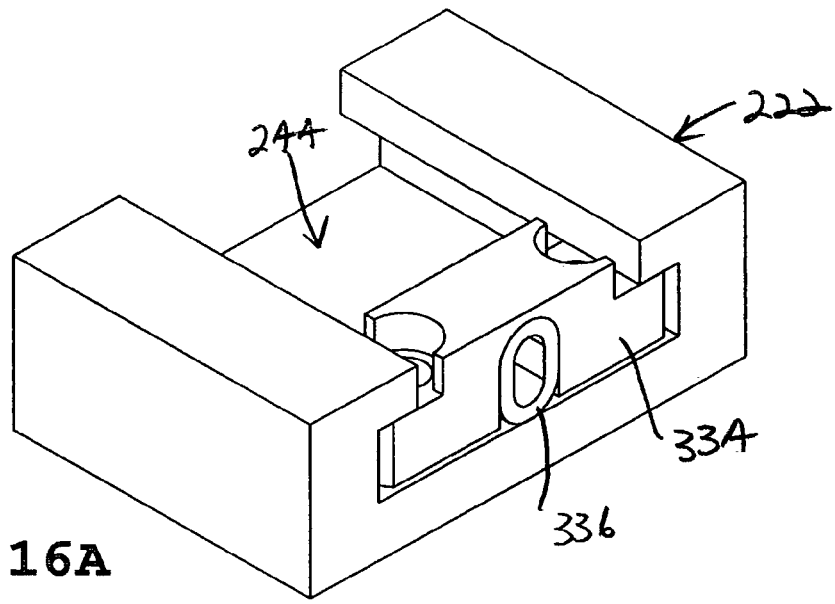
FIGS. 16A–16D illustrate components for attaching nut plates to a support; in accordance with one embodiment of the invention.

FIGS. 16A through 16D illustrate mounting structure for mounting a manifold on a support, a portion of which is seen at 222 in FIG. 16A and is seen more fully in FIG. 8. As noted above, the support has multiple tracks, such as track 224 in FIG. 8, in which the nut plates, such as nut plate 334 are mounted. As seen best in FIGS. 8 and 11, each nut plate is used in securing a corner of a modular unit in one manifold and a modular unit in an adjacent manifold, so that each modular unit requires four nut plates for its fastening to the support, and each nut plate functions in securing two side-by-side modular units in different manifolds.

Figure 16B:
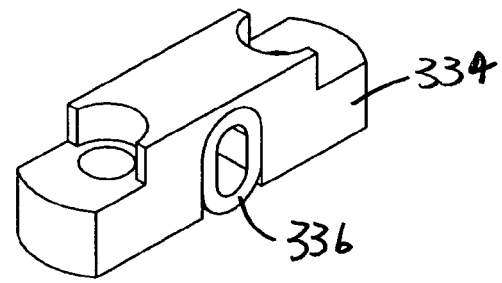
Figure 16C:
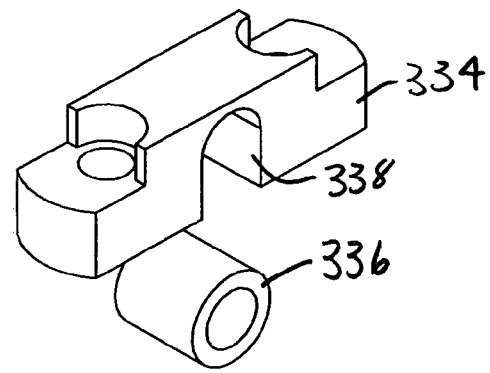
Figure 16D:
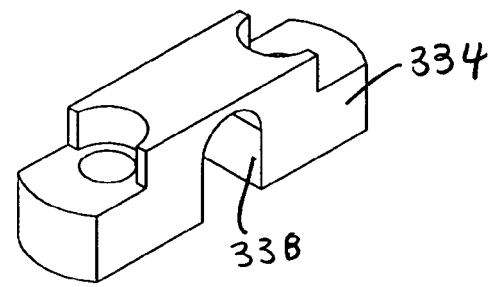

To place a nut plate in the support, a short section 336 of flexible tube, such as polymer or rubber tube, is wedged into a channel 338 formed in the nut plate, as seen in FIGS. 16B and 16C, causing the tube section to pucker slightly beyond the lower surface of the nut plate. When the nut plate is inserted into track 224, the puckered tube section rubs against the lower surface of the track, acting to hold the nut plate in place once it has been moved to a desired position. With a plurality of nut plates so placed in the support tracks, the manifold and fluid components supported thereon are now attached to the support as described with respect to FIG. 11.

FIGS. 17A–17D illustrate how the modular components described above can be adapted for securing a pipe module to a chamber, tank, or other large component or assembly. The figures show one end of a pipe module 340 and a component 341 to which one end of the pipe modules is to be attached for fluid communication with an fluid-pathway opening 343 formed in the component. Also shown are a pair of block modules 344, 346 used in securing the pipe module to the component.

Pipe module 340 includes a pipe section 348 joined at one end to a connector 350 which terminates at a collar 352. The collar has formed on its upper surface, a pair of arcuate tongues, such as shown at 354 similar to those described for the pipe modules above, for engaging corresponding grooves (not shown) formed in the lower support surfaces formed by block modules 344, 346, again, as described above.

Figure 17A:
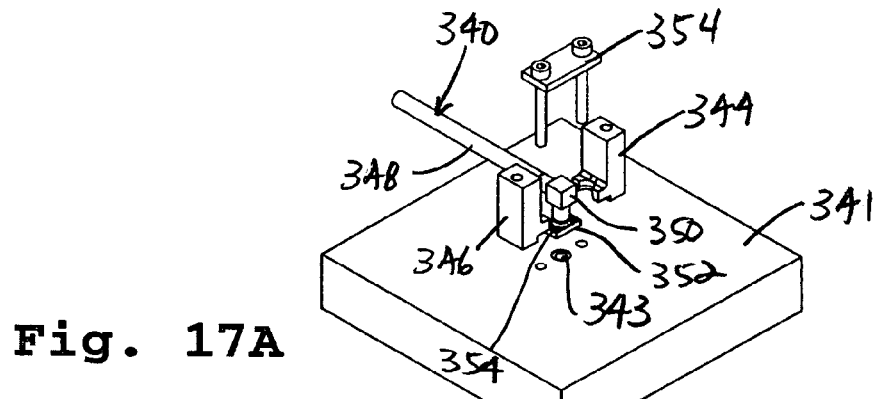
FIGS. 17A–17D illustrate connection of a pipe module to a chamber, tank, or other large component or assembly, in accordance with another aspect of the invention.
Figure 17B:
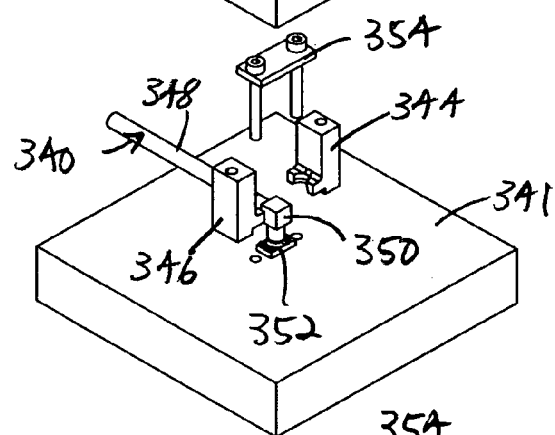
Figure 17C:
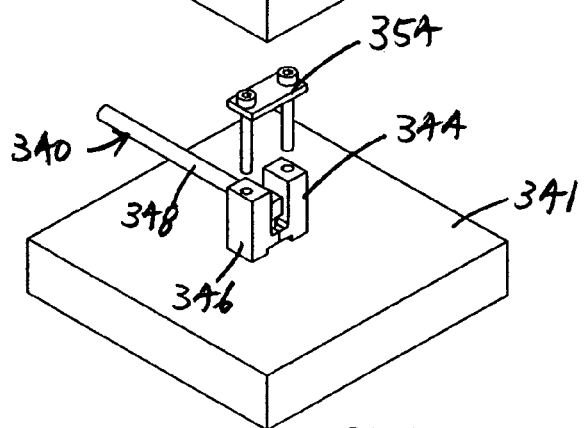
Figure 17D:
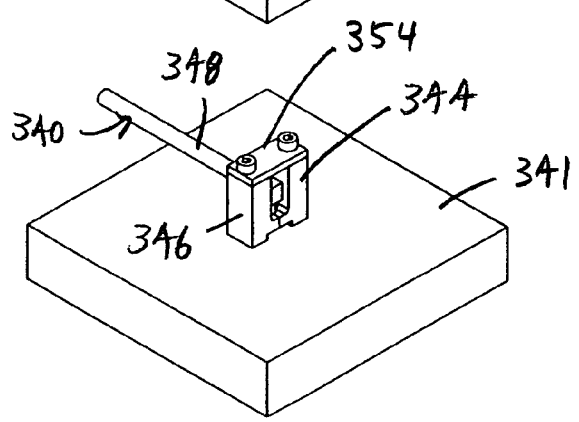

To mount the pipe module on the component (FIGS. 17A and 17B), a washer gasket (not shown) is placed over opening 343, and the pipe module is placed over the opening with the washer received in a recess formed in the lower surface of collar 352. Block modules 344, 346 are now positioned over connector 350 (FIG. 17C so that their lower surfaces form a support surface having a rectangular channel (not seen) for receiving collar 352 therein, and providing a pair of opposed grooves (not seen) in which the collar tongues are received, as described above, to hold the two block-module surface together when the block modules are tightened against the collar. As seen in FIGS. 17C and 17D, the block modules are secured to the component by a fastening member 354 having a pair of fastening bolts which are received through opening in the block modules and threaded for tightening into threaded sockets in the component.

Figure 18A:
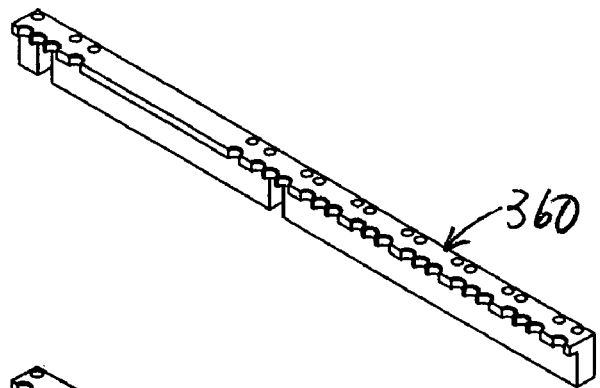
FIGS. 18A–18D illustrate extended-block structures for forming one or more manifold with the pipe modules of the invention, in accordance with another aspect of the invention.
Figure 18B:
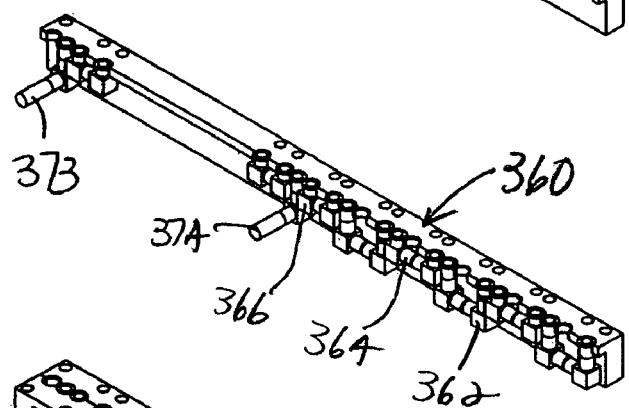

FIGS. 18A–18D illustrate another embodiment of the invention having extended block modules, such as module 360 for accommodating a plurality of pipe modules, such as pipe modules 362, 364, 366. This configuration is useful, for example, when the number and arrangement of pipe modules in a manifold is part of a common, standardized configuration. Each extended module provides a plurality of grooves along its length, and associated with each groove, a pair of locking features, such as arcuate surface grooves, for locking associated pipe-module collars to the upper surfaces formed by two confronting block modules 360, 368. Once these pipe modules are placed in one of the extended block modules, as shown in FIG. 18B, a confronting, and complementary extended block module 368 is placed against the first block modules, to form the extended manifold 370 containing a plurality of pipe modules along its length.

Figure 18C:
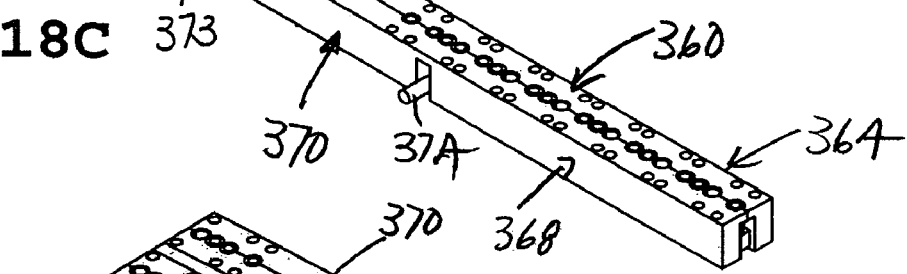
Figure 18D:
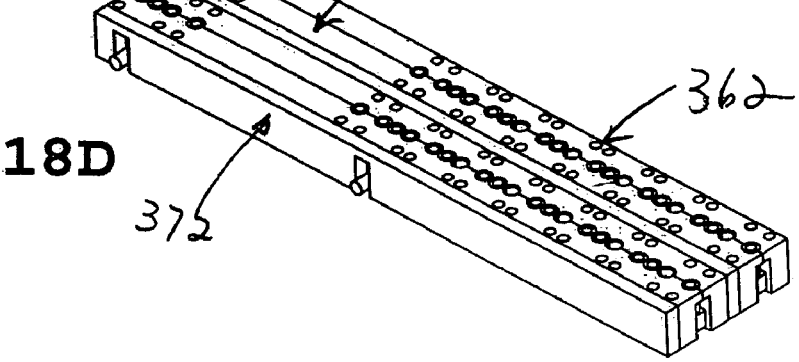

The two pipe connectors 373, 374 seen in FIGS. 18B and 18C are intended to represent the pipe connectors of cross-manifold pipe modules which are incorporated into an adjacent extended manifold 372 shown in FIG. 18D. The elongate modular units, each forming a gas-panel manifold, may be secured to a support to fluid components as described above.

The foregoing description of the embodiments of the present invention has been provided for the purposes of illustration and description. It is not intended to be exhaustive or to limit the invention to the precise embodiments disclosed. Obviously, many modifications and variations will be apparent to those skilled in this art. It is intended that the scope of the invention be defined by the following claims and their equivalents.

It is claimed:

1. Components for constructing a fluid manifold assembly having a plurality of separate fluid-flow pathways, where the manifold assembly is designed to be carried on a support, and to hold a plurality of fluid components in fluid communication with said pathways, said components comprising:

a plurality of pipe modules which form said fluid-flow pathways and which each includes an elongate pipe section and two or more connectors, each connector having a proximal end section joined in fluid communication with the elongate pipe section and a distal end section terminating at a collar, a plurality of block modules which can be placed together with one another and with said pipe modules to form the fluid manifold, where each block module provides:

(i) at least one groove formed therein, such that when two block modules are placed together, confronting grooves in the two modules form an opening in which a connector in a pipe module can be received, (ii) an upper surface region adjacent each groove, such when two block modules are placed together, confronting surface regions define a support surface for supporting the collar of a pipe module having a connector received in said opening, and (iii) structure for mounting said fluid components on said joined blocks, and for mounting said joined blocks on said support, wherein said pipe modules are supported in the fluid manifold by their collars contacting the support surfaces formed by the block modules, allowing block or pipe modules to be removed and replaced without removal of adjacent block or pipe modules.

2. The components of claim 1, wherein said pipe modules, but not said block modules, are formed of a corrosion-resistant material.

3. The components of claim 2, wherein said pipe modules are formed of a material selected from the group consisting of 304 stainless steel, 316L VIM-VAR, Hastelloy™, aluminum, and ceramic, and said block modules are formed of a material selected from the group consisting of stainless steel and aluminum.

4. The components of claim 1, wherein said pipe modules are formed with block elbow connectors joining the elongate pipe section to the connectors, and different pipe modules in the components have different-length connectors, allowing the block elbow connectors of adjacent pipe connectors in an assembled fluid manifold to be offset in the direction of the connector axes.

5. The components of claim 1, wherein the elongate pipe section in each pipe module is sufficiently compliant to accommodate variation in the vertical positions of collars of the same pipe module, when a pipe module is mounted on block modules.

6. The components of claim 1, wherein different pipe modules have different inner diameters in their elongate pipe section and connectors.

7. The components of claim 1, wherein one of the connectors in a pipe module has a narrowed diameter adjacent the associated connector collar, to restrict fluid flow through that module.

8. The components of claim 1, which further includes a cap block having a collar adapted to be supported by the support surface formed by a pair of confronting block modules, and a block adapted to provide a plugged surface against which a fluid-carrying conduit in such a fluid component can be capped.

9. The components of claim 1, which further include a pair of cross-manifold pipe modules designed to provide a fluid-flow pathway between adjacent manifolds, where each cross-manifold pipe module includes an elongate pipe section, a first connector having a proximal end section joined in fluid communication with the elongate pipe section and a distal end section terminating at a collar adapted to be supported by the support surface formed by a pair of confronting block modules, and a second connector having a proximal end section joined in fluid communication with the elongate pipe section and a distal end section terminating at a connector block adapted to be mated with the connector block in the other cross-manifold pipe module of the pair, to form an sealed connection between the two pipe modules.

10. The components of claim 1, wherein the support surface formed by two modules, when placed together, and the collar of a pipe module having a connector received in the opening formed by the two modules, have interlocking geometries that act to hold the two block modules together when force is applied on the collar against said support surface.

11. The components of claim 10, wherein said interlocking geometries are arcuate tongue-in-groove geometries.

12. The components claim 11, wherein said tongue-in-groove refers to a pair of tongues formed on opposite sides of said collar and a pair of grooves formed in opposite sides of the support surface formed by the block modules.

13. The components of claim 10, wherein the side of a collar opposite the side at which the collar contacts a support surface has an annular recess for receiving an annular seal therein, for sealing the connection between the connector of that pipe module and a fluid component.

14. The components of claim 10, wherein the pipe module collars are substantially rectangular in shape with the long axis of the collar being adapted to bridge the surface regions defining the support surface, with two block modules placed together, and with a pipe-module connector received in the associated opening formed by the block modules.

15. The components of claim 14, wherein the surface regions of the block modules forming the support surface are recessed and dimensioned to receive the rectangular collar of a supported pipe module therein.

16. The components of claim 10, wherein the structure for mounting said fluid components on said joined blocks is the same as the structure for mounting said joined blocks on said support.

17. The components of claim 1, wherein said block modules include structure for holding blocks placed together in alignment with each other.

18. The components of claim 17, wherein said structure for mounting said fluid components on said joined blocks is separate from the structure for mounting said joined blocks on said support, such that mounting a fluid component to a block can be performed independently of mounting a joined block to the support.

19. The components of claim 18, wherein said structure for mounting said joined blocks on said support includes one or more slots formed in side regions of said blocks, said each slot being adapted to receive a portion of a washer therein.

20. A modular fluid manifold assembly having a plurality of separate fluid-flow pathways, said manifold being designed to be carried on a support, and to hold a plurality of fluid components in fluid communication with said pathways, said manifold comprising:

a plurality of pipe modules which form said fluid-flow pathways and which each includes an elongate pipe section and two or more connectors, each connector having a proximal end section joined in fluid communication with the elongate pipe section and a distal end section terminating at a collar, a plurality of block modules which can be placed together with one another and with said pipe modules to form the fluid manifold, where each block module provides:

(i) at least one groove formed therein, such that when two block modules are placed together, confronting grooves in the two modules form an opening in which a connector in a pipe module can be received, (ii) a surface region adjacent each groove, such when two block modules are placed together, confronting surface regions define a support surface for supporting the collar of a pipe module having a connector received in said opening, and (iii) structure for mounting said fluid components on said joined blocks, and for mounting said joined blocks on said support, wherein said pipe modules are supported in the fluid manifold by their collars contacting the support surfaces formed by the block modules, and block modules can be removed and replaced without removal of adjacent block or pipe modules.

* * * * *